United States Patent
Li et al.

(10) Patent No.: US 12,471,164 B2
(45) Date of Patent: Nov. 11, 2025

(54) COMMUNICATION METHOD, APPARATUS, AND SYSTEM

(71) Applicant: HUAWEI TECHNOLOGIES CO., LTD., GuangDong (CN)

(72) Inventors: Meng Li, Beijing (CN); Jiangwei Ying, Beijing (CN); Yanmei Yang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 339 days.

(21) Appl. No.: 17/993,271

(22) Filed: Nov. 23, 2022

(65) Prior Publication Data
US 2023/0371098 A1    Nov. 16, 2023

Related U.S. Application Data

(63) Continuation of application No. PCT/CN2021/095880, filed on May 25, 2021.

(30) Foreign Application Priority Data

May 27, 2020    (CN) .......................... 202010461724.1

(51) Int. Cl.
*H04W 4/06*    (2009.01)
*H04W 76/15*    (2018.01)

(52) U.S. Cl.
CPC .................... *H04W 76/15* (2018.02)

(58) Field of Classification Search
CPC .......... H04W 4/06; H04W 4/08; H04L 12/185
See application file for complete search history.

(56) References Cited

U.S. PATENT DOCUMENTS

2007/0091827 A1    4/2007 Boers et al.
2020/0092923 A1    3/2020 Abraham et al.
(Continued)

FOREIGN PATENT DOCUMENTS

CN    110557724 A    12/2019
CN    110557734 A    12/2019
(Continued)

OTHER PUBLICATIONS

SA WG2 Meeting #139E, Electronic Meeting, Jun. 1-12, 2020, S2-2004219, "Solution 3 editor's notes removals," Qualcomm Incorporated, XP052461015; 8 total pages.
(Continued)

*Primary Examiner* — Shukri Taha
(74) *Attorney, Agent, or Firm* — Rimon PC

(57) ABSTRACT

Embodiments of this application disclose a communication method of adding a terminal to a multicast group by using a unicast PDU session establishment procedure. The terminal sends, to a mobility management network element, a PDU session establishment request message that includes identification information of a multicast group, where the PDU session establishment request message is used by the terminal to join the multicast group. The mobility management network element receives the PDU session establishment request message, sends the identification information of the multicast group to a session management network element, triggers the session management network element to establish a multicast PDU session, and feeds back the context information of the multicast PDU session to the terminal to allow the terminal to join the multicast group so that the terminal receives multicast data by using the multicast PDU session.

20 Claims, 7 Drawing Sheets

(56) References Cited

U.S. PATENT DOCUMENTS

2020/0351980 A1* 11/2020 Talebi Fard .......... H04W 76/40
2021/0076164 A1*  3/2021 Navratil ................. H04W 4/06
2022/0376937 A1* 11/2022 Belling ................ H04L 67/141

FOREIGN PATENT DOCUMENTS

| | | |
|---|---|---|
| CN | 110876118 A | 3/2020 |
| WO | 2019091456 A1 | 5/2019 |
| WO | 2019114938 A1 | 6/2019 |
| WO | 2019223780 A1 | 11/2019 |
| WO | 2020069295 A1 | 4/2020 |
| WO | 2021136467 A1 | 7/2021 |
| WO | 2021177716 A2 | 9/2021 |
| WO | 2021184271 A1 | 9/2021 |
| WO | 2021235779 A1 | 11/2021 |
| WO | 2021237134 A1 | 11/2021 |

OTHER PUBLICATIONS

3GPP TR 23.716 V2.0.0 (Dec. 2018), 3rd Generation Partnership Project; Technical Specification Group Services and System Aspects; Study on the Wireless and Wireline Convergence for the 5G system architecture (Release 16), 184 pages.
3GPP TS 23.501 V16.4.0 (Mar. 2020), 3rd Generation Partnership Project; Technical Specification Group Services and System Aspects; System architecture for the 5G System (5GS); Stage 2 (Release 16), 430 pages.
Huawei, HiSilicon, Telecom Italia, China Mobile, CATT, Solution for Group Communication for IoT-V2X SIDs. SA WG2 Meeting #128bis, Aug. 20-24, 2018, Sophia Antipolis, France, S2-188182, 12 pages.

* cited by examiner

COMMUNICATION METHOD, APPARATUS, AND SYSTEM

CROSS-REFERENCE TO RELATED APPLICATIONS

This application is a continuation of International Application No. PCT/CN2021/095880, filed on May 25, 2021, which claims priority to Chinese Patent Application No. 202010461724.1, filed on May 27, 2020. The disclosures of the aforementioned applications are hereby incorporated by reference in their entireties.

TECHNICAL FIELD

Embodiments of this application relate to the field of communication technologies, and in particular, to a communication method and apparatus, and a system.

BACKGROUND

In a 3rd generation partnership project (3GPP) network, there are multicast communication/broadcast communication requirements. For example, a plurality of terminals may join a same multicast group, and request a network side device (for example, an application server) to send multicast data to the multicast group.

Currently, a terminal may join a multicast group by using an internet group management protocol (IGMP) message. For example, the terminal sends, by using a unicast packet data unit (PDU) session established by a network for the terminal, a user plane message, namely, an IGMP message to a user plane function (UPF) corresponding to the unicast PDU session. After identifying that the received user plane message is a broadcast message, namely, the IGMP message, the UPF forwards the IGMP message to an application server that provides multicast data. After receiving the IGMP message, the application server adds the terminal to the multicast group, and triggers the UPF to send the multicast data to the terminal in the multicast group.

It can be learned from the foregoing that, when the terminal joins the multicast group by using the IGMP message, the UPF is required to have a capability of identifying the broadcast message, for example, the IGMP message. However, in the existing 3GPP network, not all UPFs have the capability of identifying a message type. A UPF that does not have the capability of identifying a message type cannot identify an IGMP message, and cannot forward, to an application server, the IGMP message sent by a terminal. Consequently, the terminal fails to join a multicast group, and a network side device cannot send multicast data to the terminal.

SUMMARY

Embodiments of this application provide a communication method and apparatus, and a system, so that a terminal joins a multicast group by using a unicast PDU session establishment procedure, to ensure normal transmission of multicast data.

To achieve the foregoing objectives, the following technical solutions are used in embodiments of this application.

According to a first aspect of embodiments of this application, a communication method is provided, where the method includes: A terminal sends a PDU session establishment request message that includes identification information of a multicast group to a mobility management network element, where the PDU session establishment request message is used by the terminal to join the multicast group; the terminal receives a PDU session establishment accept message that is from the mobility management network element and that includes context information of a multicast PDU session corresponding to the multicast group, where the context information of the multicast PDU session is used by the terminal to receive multicast data by using the multicast PDU session.

Based on the method according to the first aspect, the terminal sends, to the mobility management network element by using a PDU session establishment procedure, the PDU session establishment request message that includes the identification information of the multicast group, to request to join the multicast group, so that, after the mobility management network element receives the PDU session establishment request message, a session management network element that manages the multicast PDU session is triggered to obtain the context information of the multicast PDU session when determining that the terminal joins the multicast group, and the mobility management network element is triggered to include the context information of the multicast PDU session in the PDU session establishment accept message and send the PDU session establishment accept message to the terminal. Therefore, the terminal receives the multicast data based on the context information of the multicast PDU session. In this way, the terminal may be added to the multicast group by using the PDU session establishment procedure, so that the terminal receives data by using the multicast PDU session of the multicast group, and group communication is implemented. In addition, the PDU session establishment procedure is the same as a procedure of establishing a unicast PDU session for the terminal, so that design complexity is reduced. In this disclosure, a network element, e.g., a mobility management network element or a session establishment network element, may refer to a network device, which may be standalone or a component or part of an apparatus.

In a possible design, the method further includes: The terminal receives the multicast data by using the multicast PDU session. Based on the possible design, the multicast data may be sent to the terminal by using the multicast PDU session corresponding to the multicast group, so that the multicast data is integrated into one multicast PDU session for transmission, to improve resource utilization.

In a possible design, the PDU session establishment request message carries an N1 session management container, where the N1 session management container includes the identification information of the multicast group. Based on the possible design, the terminal may include the identification information of the multicast group in the N1 session management container and send the N1 session management container to the mobility management network element, so that the mobility management network element transparently transmits, without parsing the identification information of the multicast group that is carried in the N1 session management container, the identification information of the multicast group to the session management network element that manages the multicast PDU session. In this way, design complexity of the mobility management network element can be reduced.

In a possible design, the PDU session establishment request message further includes one or more of the following information: identification information of a data network used to transmit the multicast data, identification information of a network slice used to transmit the multicast data, identification information of a unicast PDU session of the terminal, and identification information of the multicast PDU session. Based on the possible design, the terminal may include some other auxiliary information in the PDU session establishment request message and send the PDU session establishment request message to the mobility management network element, so that the mobility management network element determines, in combination with the identification information of the multicast group and the auxiliary information, the session management network element that manages the multicast PDU session, to improve accuracy of determining the session management network element that manages the multicast PDU session.

In a possible design, the context information of the multicast PDU session includes a start time of the multicast data, an end time of the multicast data, a receiving frequency of the multicast data, quality of service (QoS) information of the multicast data, and the like. Based on the possible design, the terminal may receive the multicast data based on a plurality of pieces of information of the multicast PDU session, to improve accuracy of receiving the multicast data.

In still another possible design, the method further includes: The terminal receives context information of the unicast PDU session that is used by the terminal to receive the multicast data by using the unicast PDU session and that is from the mobility management network element. Based on the possible design, in a process in which the terminal joins the multicast group using the PDU session establishment procedure, a transmission resource of the unicast PDU session may be established for the terminal at the same time, so that the quantity of the terminals that join the multicast group is small. In this way, when the multicast PDU session corresponding to the multicast group is released or the terminal moves out of a multicast/broadcast area and cannot receive the multicast data using the unicast PDU session, the multicast data is sent to the terminal using the unicast PDU session, to ensure the continuity of receiving the multicast data by the terminal.

In still another possible design, the method further includes: The terminal sends, to the mobility management network element, a first message that includes the identification information of the terminal and the identification information of the multicast group, where the first message is used by the terminal to leave the multicast group; and the terminal receives a response to the first message returned by the mobility management network element. Based on the possible design, the terminal may notify the mobility management network element of a message used by the terminal to leave the multicast group, so that a network side device learns that the terminal leaves the multicast group, and manages the terminal that joins the multicast group.

In still another possible design, the first message is a PDU session release request message or a PDU session modification request message. Based on the possible design, the terminal may notify, by using a PDU session release procedure or a PDU session modification procedure, the mobility management network element of a message for leaving the multicast group and include the first message by using an existing signaling message, to reduce signaling overheads.

According to a second aspect, this application provides a communication apparatus. The communication apparatus may be a terminal or a chip or a system on a chip in a terminal, or may be a server that provides a service for a terminal or a chip or a system on a chip in the server. The communication apparatus may implement a function according to any one of the first aspect or the possible designs of the first aspect. The function may be implemented by hardware, or may be implemented by hardware executing corresponding software. The hardware or the software includes one or more modules or units corresponding to the function. For example, the communication apparatus may include a sending unit and a receiving unit.

The sending unit is configured to send, to a mobility management network element, a PDU session establishment request message that includes identification information of a multicast group, where the PDU session establishment request message is used by the terminal to join the multicast group.

The receiving unit is configured to receive a PDU session establishment accept message from the mobility management network element, where the PDU session establishment accept message includes context information of a multicast PDU session corresponding to the multicast group, and the context information of the multicast PDU session is used by the terminal to receive multicast data by using the multicast PDU session.

For a specific implementation of the communication apparatus, refer to an operation function of the terminal in the communication method according to any one of the first aspect or the possible designs of the first aspect. Details are not described herein again. Therefore, the provided communication apparatus can achieve the same beneficial effects as any one of the first aspect or the possible designs of the first aspect.

According to a third aspect, a communication apparatus is provided, including a processor and a memory, where the memory is configured to store computer-executable instructions; and when the communication apparatus runs, the processor executes the computer-executable instructions stored in the memory, so that the communication apparatus performs the communication method according to any one of the first aspect or the possible designs of the first aspect.

According to a fourth aspect, a computer-readable storage medium is provided, where the computer-readable storage medium stores instructions; and when the instructions are run on a computer, the computer is enabled to perform the communication method according to any one of the first aspect or the possible designs of the first aspect.

According to a fifth aspect, a computer program product is provided, including instructions; and when the instructions are run on a computer, the computer is enabled to perform the communication method according to any one of the first aspect or the possible designs of the foregoing aspect.

According to a sixth aspect, a chip system is provided, where the chip system includes a processor and a communication interface that are configured to support a communication apparatus in implementing the function in any one of the first aspect or the possible designs of the first aspect. For example, the processor sends, to a mobility management network element through the communication interface, a PDU session establishment request message that includes identification information of a multicast group, where the PDU session establishment request message is used by a terminal to join the multicast group; and the processor receives, through the communication interface, a PDU session establishment accept message from the mobility management network element, where the PDU session establishment accept message includes context information of a multicast PDU session corresponding to the multicast group, and the context information of the multicast PDU session is used by the terminal to receive multicast data by using the multicast PDU session. In a possible design, the chip system further includes a memory. The memory is configured to store program instructions and data that are necessary for the communication apparatus. The chip system may include a chip, or a chip and other components.

For technical effects achieved by any one of the design manners of the third aspect to the sixth aspect, refer to the technical effects achieved by any one of the first aspect or the possible designs of the first aspect. Details are not described again.

According to a seventh aspect, an embodiment of this application provides another communication method. The method may include: A mobility management network element receives a PDU session establishment request message that includes identification information of a multicast group and that is from a terminal; sends the identification information of the multicast group to a session management network element based on the PDU session establishment request message; receives context information of a multicast PDU session from the session management network element; and sends a PDU session establishment accept message that includes the context information of the multicast PDU session to the terminal.

Based on the method according to the seventh aspect, the mobility management network element may receive the PDU session establishment request message initiated by the terminal, and send the identification information of the multicast group in the PDU session establishment request message to the session management network element. After deciding to add the terminal to the multicast group, the session management network element sends the context information of the multicast PDU session to the mobility management network element. The mobility management network element receives the context information of the multicast PDU session and sends the context information of the multicast PDU session to the terminal, so that the terminal receives multicast data by using the context information of the multicast PDU session. In this way, the terminal may be added to the multicast group by using a PDU session establishment procedure between the terminal and a core network device, and the multicast data is transmitted by using the multicast PDU session, so that group communication is implemented.

In a possible design, the PDU session establishment request message carries an N1 session management container, where the N1 session management container includes the identification information of the multicast group. Based on the possible design, the mobility management network element may receive, from the terminal, the N1 session management container that includes the identification information of the multicast group, so that the mobility management network element transparently transmits, without parsing the identification information of the multicast group that is carried in the N1 session management container, the identification information of the multicast group to the session management network element that manages the multicast PDU session. In this way, design complexity of the mobility management network element can be reduced.

In a possible design, the PDU session establishment request message further includes one or more of the following information: identification information of a data network used to transmit the multicast data, identification information of a network slice used to transmit the multicast data, identification information of a unicast PDU session of the terminal, and identification information of the multicast PDU session. Based on the possible design, the mobility management network element may receive some other auxiliary information from the terminal, so that the mobility management network element determines, in combination with the identification information of the multicast group and the auxiliary information, the session management network element that manages the multicast PDU session, to improve accuracy of determining the session management network element that manages the multicast PDU session.

In a possible design, the context information of the multicast PDU session includes one or more of the following: an start time of the multicast data, an end time of the multicast data, a receiving frequency of the multicast data, and QoS information of the multicast data. Based on the possible design, the terminal may receive the multicast data based on a plurality of pieces of information of the multicast PDU session, to improve accuracy of receiving the multicast data.

In a possible design, the method further includes: The mobility management network element receives a first message that is from the terminal and that is used by the terminal to leave the multicast group, where the first message carries identification information of the terminal and the identification information of the multicast group; the mobility management network element sends the first message to the session management network element; and the mobility management network element receives a response to the first message, and sends the response to the first message to the terminal. Based on the possible design, the mobility management network element may report, to the session management network element, that the terminal leaves the multicast group, so that the session management network element can manage the terminal in the multicast group in real time. In addition, when the quantity of the terminals that join the multicast group is small or when the terminal moves out of a multicast/broadcast area and cannot receive the multicast data by using a unicast PDU session, the multicast PDU session corresponding to the multicast group is released, to improve resource utilization.

In a possible design, that the mobility management network element sends the identification information of the multicast group to a session management network element based on the PDU session establishment request message includes: The mobility management network element sends the identification information of the multicast group to a first network element; and the mobility management network element receives identification information of the session management network element from the first network element, where the first network element includes a unified data repository (UDR), a policy control function (PCF), unified data management (UDM), or a network storage function (NRF). Based on the possible design, the mobility management network element may learn of, from the UDR, the PCF, the UDM, or the NRF, the session management network element that manages the multicast PDU session, to improve design flexibility.

According to an eighth aspect, a communication apparatus is provided. The communication apparatus may be a mobility management network element, or a chip or a system on a chip in a mobility management network element. The communication apparatus may implement a function performed by the mobility management network element according to any one of the seventh aspect or the possible designs of the seventh aspect. The function may be implemented by hardware, or may be implemented by hardware executing corresponding software. The hardware or the software includes one or more modules corresponding to the function. For example, the communication apparatus may include a receiving unit and a sending unit.

The receiving unit is configured to receive a packet data unit (PDU) session establishment request message from a terminal, where the PDU session establishment request message includes identification information of a multicast group, and the PDU session establishment request message is used by the terminal to join the multicast group.

The sending unit is configured to send the identification information of the multicast group to a session management network element based on the PDU session establishment request message, where the session management network element is configured to manage a multicast PDU session corresponding to the multicast group.

The receiving unit is further configured to receive context information of the multicast PDU session from the session management network element, and the context information of the multicast PDU session is used by the terminal to receive multicast data by using the multicast PDU session.

The sending unit is further configured to send a PDU session establishment accept message to the terminal, where the PDU session establishment accept message includes the context information of the multicast PDU session.

For a specific implementation of the communication apparatus, refer to an operational function of the mobility management network element in the communication method according to any one of the seventh aspect or the possible designs of the seventh aspect. Any one of the seventh aspect or the possible designs of the seventh aspect may be correspondingly implemented by the receiving unit and the sending unit that are included in the communication apparatus.

According to a ninth aspect, a communication apparatus is provided, including a processor and a memory, where the memory is configured to store computer-executable instructions; and when the communication apparatus runs, the processor executes the computer-executable instructions stored in the memory, so that the communication apparatus performs the communication method according to any one of the seventh aspect or the possible designs of the seventh aspect.

According to a tenth aspect, a computer-readable storage medium is provided, where the computer-readable storage medium stores instructions; and when the instructions are run on a computer, the computer is enabled to perform the communication method according to any one of the seventh aspect or the possible designs of the seventh aspect.

According to an eleventh aspect, a computer program product is provided, including instructions; and when the instructions are run on a computer, the computer is enabled to perform the communication method according to any one of the seventh aspect or the possible designs of the foregoing aspect.

According to a twelfth aspect, a chip system is provided, where the chip system includes a processor and a communication interface that are configured to support a communication apparatus in implementing the functions in the foregoing aspects. For example, the processor receives, from a terminal through the communication interface, a PDU session establishment request message that includes identification information of a multicast group, sends the identification information of the multicast group to a session management network element based on the PDU session establishment request message, receives context information of a multicast PDU session, and sends a PDU session establishment accept message that includes the context information of the multicast PDU session to the terminal. In a possible design, the chip system further includes a memory. The memory is configured to store program instructions and data that are necessary for the communication apparatus. The chip system may include a chip, or may include a chip and another discrete component.

For technical effects achieved by any one of the design manners of the ninth aspect to the twelfth aspect, refer to the technical effects achieved by any one of the seventh aspect or the possible designs of the seventh aspect. Details are not described again.

According to a thirteenth aspect, a communication method is further provided. The method includes: A session management network element receives identification information of a multicast group, and sends, to a mobility management network element based on the identification information of the multicast group, context information of a multicast PDU session corresponding to the multicast group. Based on the possible design, the session management network element may add a terminal to the multicast PDU session based on the received identification information and return the context information of the multicast PDU session. In this way, the terminal may be added to the multicast group using a PDU session establishment procedure initiated by a control plane, so that multicast data is sent to the terminal using the multicast PDU session without the terminal joining the multicast group by using a user plane broadcast message. In this way, design complexity and signaling overheads are reduced by using the existing PDU session establishment procedure.

In a possible design, the method further includes: The session management network element sends the identification information of the multicast group to a first network element; and the session management network element receives the context information of the multicast PDU session from the first network element, where the first network element includes a UDR, a PCF, UDM, or an NRF. Based on the possible design, the mobility management network element may learn of the context information of the multicast PDU session from the UDR, the PCF, the UDM, or the NRF, to improve design flexibility.

In a possible design, the method further includes: When the quantity of the terminals that join the multicast group is greater than a first threshold, the session management network element obtains the context information of the multicast PDU session. Based on the possible design, when there are a large quantity of terminals that join the multicast group, the context information of the multicast PDU session may be obtained, and the multicast data is transmitted by using the multicast PDU session. In this way, the multicast data is sent to more than one terminal by using one PDU session, to improve resource utilization.

In a possible design, the method further includes: The session management network element receives one or more of the following information from the mobility management network element: identification information of a data network used to transmit the multicast data, identification information of a network slice used to transmit the multicast data, identification information of a unicast PDU session of the terminal, and identification information of the multicast PDU session. Based on the possible design, the session management network element may obtain some other auxiliary information other than the identification information of the multicast group from the mobility management network element, so that the session management network element obtains the context information of the multicast PDU session based on the information, to ensure that the context information of the multicast PDU session is accurately obtained.

In a possible design, the context information of the multicast PDU session includes one or more of the following: a start time of the multicast data, an end time of the multicast data, a receiving frequency of the multicast data, and QoS information of the multicast data. Based on the possible design, the session management network element may send a plurality of pieces of information of the multicast PDU session to the terminal, so that the terminal receives the multicast data based on the context information of the multicast PDU session, to improve multicast data receiving accuracy.

In a possible design, the method further includes: The session management network element sends context information of the unicast PDU session that is used by the terminal to receive the multicast data by using the unicast PDU session. Based on the possible design, in a process in which the terminal joins the multicast group by using the PDU session establishment procedure, the session management network element may establish a transmission resource of the unicast PDU session for the terminal at the same time, so that the quantity of the terminals that join the multicast group is small. In this way, when the multicast PDU session corresponding to the multicast group is released or the terminal moves out of a multicast/broadcast area and cannot receive the multicast data by using the unicast PDU session, the multicast data is sent to the terminal by using the unicast PDU session, to ensure that continuity of receiving the multicast data by the terminal is not affected.

In a possible design, the method further includes: The session management network element receives a first message used by the terminal to leave the multicast group, where the first message includes the identification information of the multicast group; the session management network element updates a context of the multicast group based on the first message; and the session management network element sends a response to the first message. Based on the possible design, the session management network element may update the context of the multicast group in real time when the terminal leaves the multicast group, and manage the multicast group.

In a possible design, the method further includes: If the quantity of the terminals that join the multicast group is fewer than a second threshold after the terminal leaves the multicast group, the session management network element sends, to a user plane network element corresponding to the multicast PDU session, a release notification message that notifies the user plane network element to release the multicast PDU session. Based on the possible design, when there is no multicast group or there is a small quantity of terminals in the multicast group, the multicast PDU session used to transmit the multicast data may be released, to improve resource utilization.

In a possible design, the method further includes: The session management network element sends, to a user plane network element corresponding to the unicast PDU session, indication information that indicates the user plane network element corresponding to the unicast PDU session to send the multicast data by using the unicast PDU session. Based on the possible design, the session management network element may notify the user plane network element to switch a PDU session used to transmit the multicast data to the unicast PDU session, and notify the UPF to transmit the multicast data by using the unicast PDU session, to ensure continuity of multicast data transmission.

According to a fourteenth aspect, this application provides a communication apparatus. The communication apparatus may be a session management network element, or a chip or a system on a chip in a session management network element. The communication apparatus may implement a function performed by the session management network element according to any one of the thirteenth aspect or the possible designs of the thirteenth aspect. The function may be implemented by hardware, or may be implemented by hardware executing corresponding software. The hardware or the software includes one or more modules corresponding to the function. For example, the communication apparatus may include a receiving unit and a sending unit.

The receiving unit is configured to receive identification information of a multicast group.

The sending unit is configured to send context information of a multicast PDU session corresponding to the multicast group to a mobility management network element based on the identification information of the multicast group.

For a specific implementation of the communication apparatus, refer to a behavior function of the session management network element in the communication method according to any one of the thirteenth aspect or the possible designs of the thirteenth aspect. The method according to any one of the thirteenth aspect or the possible designs of the thirteenth aspect may be correspondingly implemented by the receiving unit and the sending unit included in the communication apparatus.

According to a fifteenth aspect, a communication apparatus is provided, including a processor and a memory, where the memory is configured to store computer executable instructions; and when the communication apparatus runs, the processor executes the computer executable instructions stored in the memory, so that the communication apparatus performs the communication method according to any one of the thirteenth aspect or the possible designs of the thirteenth aspect.

According to a sixteenth aspect, a computer-readable storage medium is provided, where the computer-readable storage medium stores instructions; and when the instructions are run on a computer, the computer is enabled to perform the communication method according to any one of the thirteenth aspect or the possible designs of the thirteenth aspect.

According to a seventeenth aspect, a computer program product is provided, including instructions; and when the instructions are run on a computer, the computer is enabled to perform the communication method according to any one of the thirteenth aspect or the possible designs of the foregoing aspect.

According to an eighteenth aspect, a chip system is provided, where the chip system includes a processor and a communication interface that are configured to support a communication apparatus in implementing the functions in the foregoing aspects. For example, the processor receives identification information of a multicast group through the communication interface, and sends context information of a multicast PDU session corresponding to the multicast group to a mobility management network element based on the identification information of the multicast group. In a possible design, the chip system further includes a memory. The memory is configured to store program instructions and data that are necessary for the communication apparatus. The chip system may include a chip, or may include a chip and other components.

For a technical effect achieved in any one of the fifteenth aspect to the eighteenth aspect, refer to the technical effect achieved in any one of the thirteenth aspect or the possible designs of the thirteenth aspect. Details are not described herein again.

According to a nineteenth aspect, a communication system is provided. The communication system may include the terminal according to any one of the second aspect to the sixth aspect, the mobility management network element according to any one of the eighth aspect to the twelfth aspect, and the session management network element according to any one of the fourteenth aspect to the eighteenth aspect.

DESCRIPTION OF EMBODIMENTS

Figure 1:
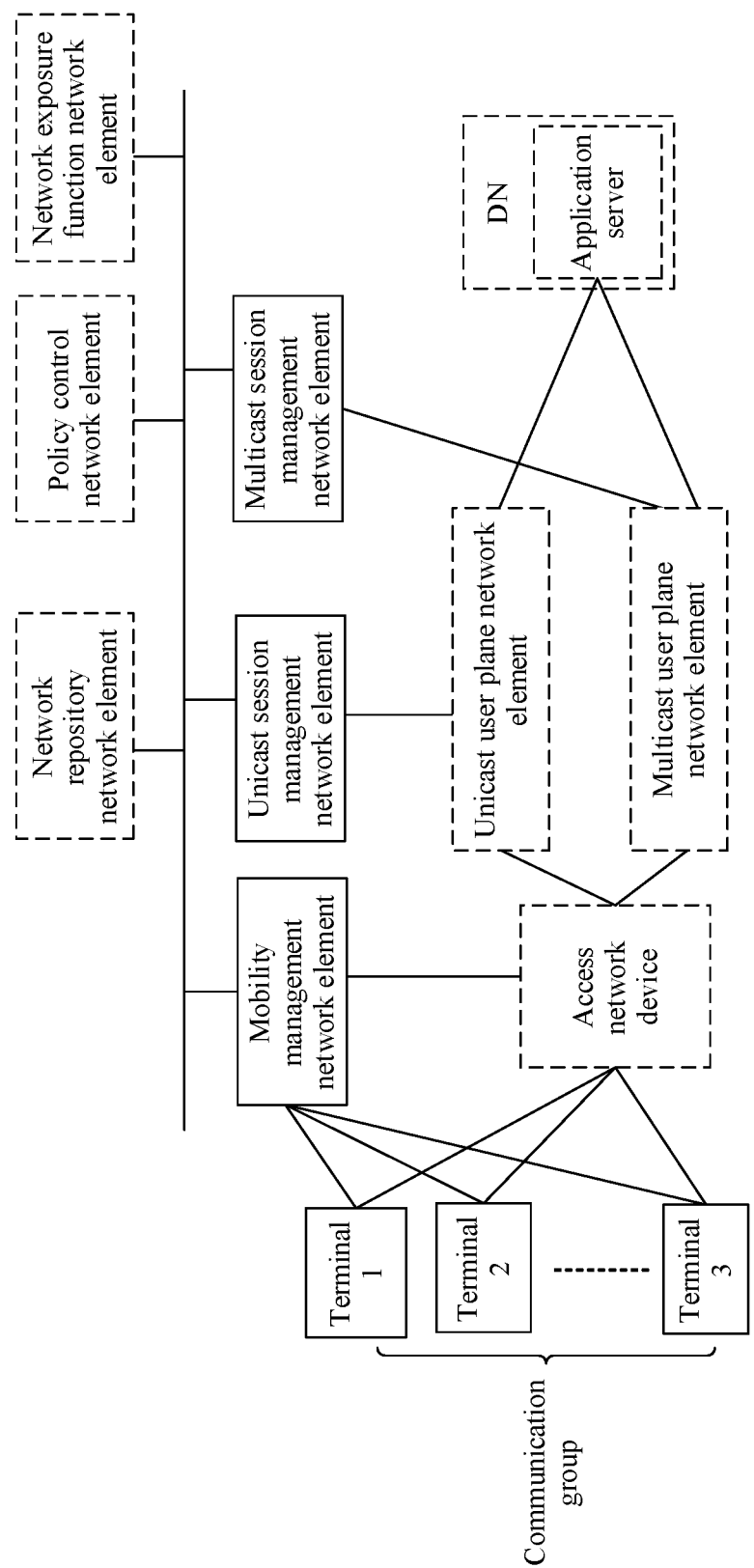
FIG. 1 is a schematic diagram of an architecture of a communication system.

In a communication system, when a network side device sends the same multicast data to a plurality of terminals, the data is sent to the plurality of terminals by using a same PDU session, for example, a multicast PDU session, to improve resource utilization. To receive the multicast data by using the multicast PDU session, the plurality of terminals that receive the same multicast data need to join a same multicast group in advance.

For example, a terminal may join a multicast group by using an IGMP message. The terminal sends the IGMP message to a UPF corresponding to a unicast PDU session of the terminal. After identifying that the received message is a broadcast message, namely, an IGMP message, the UPF forwards the IGMP message to an application server. After receiving the IGMP message, the application server sends, to the terminal by using an application layer, related configuration information to be used by the terminal to receive multicast data by using a multicast PDU session, to add the terminal to the multicast group.

However, not all UPFs in a communication system have the capability of identifying a message type. A UPF that does not have the capability of identifying a message type cannot identify the IGMP message, and cannot forward, to the application server, the IGMP message sent by the terminal. Consequently, the terminal fails to join the multicast group, and the network side device cannot send multicast data to the terminal.

To resolve the technical problem, embodiments of this application provide a communication method. The method includes: A terminal sends, to a mobility management network element, a PDU session establishment request message for joining a multicast group by the terminal, where the PDU session establishment request message includes identification information of the multicast group. The mobility management network element receives the PDU session establishment request message from the terminal, and sends, based on the PDU session establishment request message, the identification information of the multicast group to a session management network element that manages a multicast PDU session corresponding to the multicast group. The session management network element receives the identification information of the multicast group, and sends context information of the multicast PDU session to the mobility management network element. The mobility management network element receives the context information of the multicast PDU session, and sends, to the terminal, a PDU session establishment accept message that includes the context information of the multicast PDU session. The terminal receives the PDU session establishment accept message, and receives multicast data based on the context information of the multicast PDU session. To be specific, the terminal joins the multicast group by using an existing PDU session establishment procedure, and receives the multicast data based on the context information of the multicast PDU session corresponding to the multicast group, to implement group communication. In addition, the PDU session establishment procedure is the same as a procedure of establishing a unicast PDU session for the terminal, so that design complexity is reduced.

The following describes a communication method provided in embodiments of this application with reference to the accompanying drawings in embodiments of this application.

The communication method provided in embodiments of this application may be applied to a communication system shown in FIG. 1. As shown in FIG. 1, the communication system may include a terminal, a mobility management network element, and a session management network element; and may further include an access network device, a user plane network element, a network slice selection network element, a network repository network element, a policy control network element, a network exposure function network element, and a data network (DN). The DN may include an application server, and the application server may be an application function (AF). The session management network element may include a unicast session management network element and a multicast session management network element. The user plane network element may include a multicast user plane network element and a unicast user plane network element. In the system shown in FIG. 1, there may be two types of PDU sessions: a unicast packet data unit (PDU) session and a multicast PDU session. The unicast PDU session is a PDU session oriented to a specific terminal, and is used to send data to the specific terminal. A transmission path of the unicast PDU session may be: an application server↔a unicast user plane network element↔an access network device↔a terminal. The multicast PDU session may be a PDU session oriented to a specific communication group, and is used to send multicast data to all terminals in the communication group. A transmission path of the multicast PDU session may be: an application server↔a multicast user plane network element↔an access network device↔all terminals in a specific communication group. The unicast user plane network element and the multicast user plane network element may be the same or different. This is not limited. In the system shown in FIG. 1, a session management network element that manages a multicast PDU session may be referred to as a multicast session management network element. A session management network element that manages a unicast PDU session may be referred to as a unicast session management network element. The multicast session management network element and the unicast session management network element may be a same network element or different network elements.

The following describes network elements or devices in the architecture shown in FIG. 1.

The terminal may be a device configured to implement a wireless communication function, for example, a terminal or a chip that can be used in the terminal. The terminal may be user equipment (UE), an access terminal, a terminal unit, a terminal station, a mobile station, a remote station, a remote terminal, a mobile device, a wireless communication device, a terminal agent, a terminal apparatus, or the like in a 5G network or a future evolved communication system. The access terminal may be a cellular phone, a cordless phone, a session initiation protocol (SIP) phone, a wireless local loop (WLL) station, a personal digital assistant (PDA), a handheld device or a computing device having a wireless communication function, another processing device, vehicle-mounted device, or wearable device connected to a wireless modem, a virtual reality (VR) terminal device, an augmented reality (AR) terminal device, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like. The terminal may be mobile or fixed.

The access network device is configured to implement functions such as a physical layer function, resource scheduling and management, and access control and mobility management of the terminal. The access network device may be a device supporting wired access, or may be a device supporting wireless access. For example, the access network device may be an access network (AN)/a radio access network (RAN), where the AN/RAN includes a plurality of 5G-AN/5G-RAN nodes. The 5G-AN/5G-RAN node may be an access point (AP), a NodeB (NB), an enhanced NodeB (eNB), a next-generation NodeB (NR NodeB, gNB), a transmission reception point (TRP), a transmission point (TP), another access node, or the like.

The mobility management network element is responsible for access authentication of the terminal, mobility management, signaling exchange between functional network elements, and the like, such as managing a registration status of a user, a connection status of a user, user registration and network access, tracking area update, user authentication during cell handover, and key security.

The session management network element is configured to implement a user plane transmission logical channel, for example, session management functions such as establishment, release, and change of a PDU session.

The user plane network element may be used as an anchor on the user plane transmission logical channel, and is configured to complete functions such as routing and forwarding of user plane data. For example, the user plane network element establishes a channel (namely, the user plane transmission logical channel) between the user plane network element and the terminal, forwards a data packet between the terminal and the DN on the channel, and is responsible for data packet filtering, data forwarding, rate control, and generation of charging information for the terminal.

The network exposure function network element may be configured to implement functions such as exposing an event and a capability of a core network, mutual translation between an external parameter of the core network and an internal parameter of the core network, receiving and storing identification information provided by an external network element of the core network, and selecting a core network element. The external network element of the core network may include an application server and the like.

The policy control network element may be configured to provide a policy, for example, a quality of service policy or a slice selection policy, for the mobility management network element and the session management network element.

The network repository network element may be configured to store user data such as subscription information and authentication or authorization data of a user. Specifically, the network repository network element may be a unified data management (UDM), a network repository function (NRF), a unified data repository (UDR), or the like.

The network slice selection network element may be configured to: select a network slice (NS), select a set of mobility management network elements, select a set of NRFs (NRFs), or the like.

The DN is an operator network that may provide a data transmission service for a user, for example, an operator network that may provide an internet protocol (IP) multimedia service (IP multi-media service, IMS) for the user. An application server (AS) may be deployed in the DN, and the application server may provide the data transmission service for the user.

It should be noted that FIG. 1 is merely an example diagram of the architecture. In addition to the functional units shown in FIG. 1, the system may further include another functional network element, for example, an operation and management (O&M) network element. This is not limited in this embodiment of this application. In addition, the names of the devices in FIG. 1 are not limited. In addition to or instead of the names shown in FIG. 1, the devices may also have other names. For example, the names may be replaced with names of network elements having same or similar functions. This is not limited.

The system shown in FIG. 1 may be a 3rd generation partnership project (3GPP) communication system, for example, a 4th generation (4G) communication system, a long term evolution (LTE) system, a 5th generation (5G) communication system, a new radio (NR) system, a next generation communication system, or a non-3GPP communication system. This is not limited.

Figure 2A:
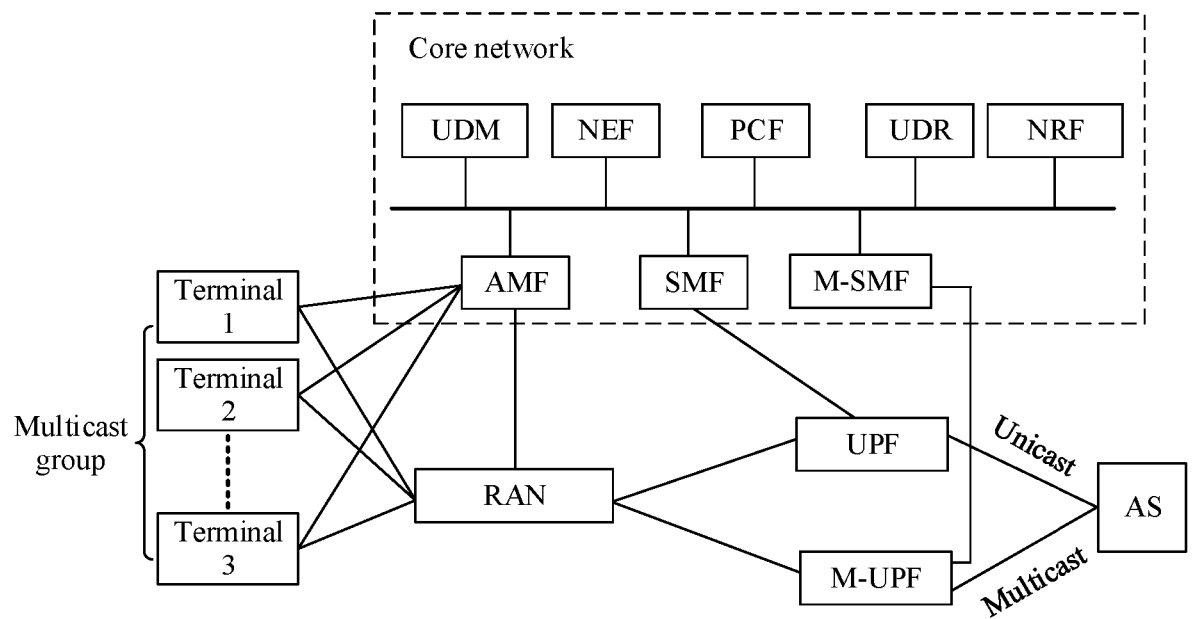
FIG. 2a is a schematic diagram of an architecture of a 5G communication system.

For example, the communication system shown in FIG. 1 is a 5G communication system shown in FIG. 2a. As shown in FIG. 2a, a network element or an entity corresponding to the multicast session management network element may be a session management function (SMF) in the 5G communication system. The multicast session management network element may be a multicast session management function (M-SMF) in the 5G communication system. A network element or an entity corresponding to the user plane network element may be a user plane function (UPF) in the 5G communication system. The multicast user plane network element may be a multicast user plane function (M-UPF) in the 5G communication system. A network element or an entity corresponding to the access network device may be a radio access network (RAN) in the 5G communication system. A network element or an entity corresponding to the mobility management network element may be an access and mobility management function (AMF) in the 5G communication system. The policy control network element may be a policy control function (PCF) in the 5G communication system. A network element or an entity corresponding to the network exposure function network element may be a network exposure function (NEF) in the 5G communication system. A network element or an entity corresponding to the network slice selection network element may be a network slice selection function in the 5G communication system. A network element or an entity corresponding to the network repository network element may be an NRF, a UDR, or UDM in the 5G communication system.

Figure 2B:
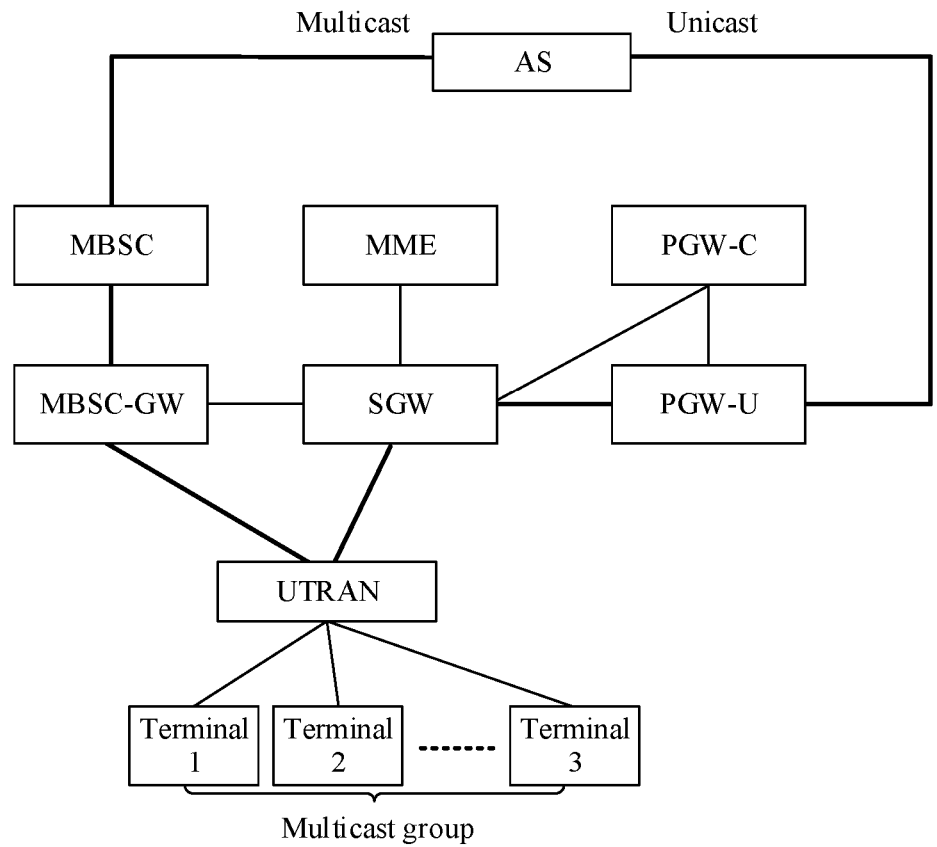
FIG. 2b is a schematic diagram of an architecture of a 4G communication system.

For example, the communication system shown in FIG. 1 is a 4G communication system shown in FIG. 2b. As shown in FIG. 2b, a network element or an entity corresponding to the multicast session management network element may be a multicast/broadcast service controller (MBSC) in the 4G communication system. The session management network element may be a packet data network (PDN) gateway control plane function (PDN gateway control plane function, PGW-C) in the 4G communication system. A network element or an entity corresponding to the user plane network element may be a PDN gateway user plane function (PGW-U) in the 4G communication system. A network element or an entity corresponding to the access network device may be a universal mobile telecommunication system terrestrial access network (UMTS terrestrial radio access network, UTRAN) in the 4G communication system. A network element or an entity corresponding to the mobility management network element may be a mobility management entity (MME) in the 4G communication system. In addition, the 4G communication system shown in FIG. 2b further includes a multicast/broadcast gateway (MBSC-GW) and a serving gateway (SGW).

Optionally, the session management network element and the mobility management network element in embodiments of this application each may also be referred to a communication apparatus, and may be a general-purpose device or a dedicated device. This is not specifically limited in embodiments of this application.

Optionally, related functions of the session management network element or the mobility management network element in embodiments of this application may be implemented by one device, may be jointly implemented by a plurality of devices, or may be implemented by one or more functional modules in one device. This is not specifically limited in embodiments of this application. It may be understood that the functions may be functions of a network element in a hardware device, may be functions of software running on dedicated hardware, functions of a combination of hardware and software, or a virtualization function instantiated on a platform (for example, a cloud platform).

Figure 3:
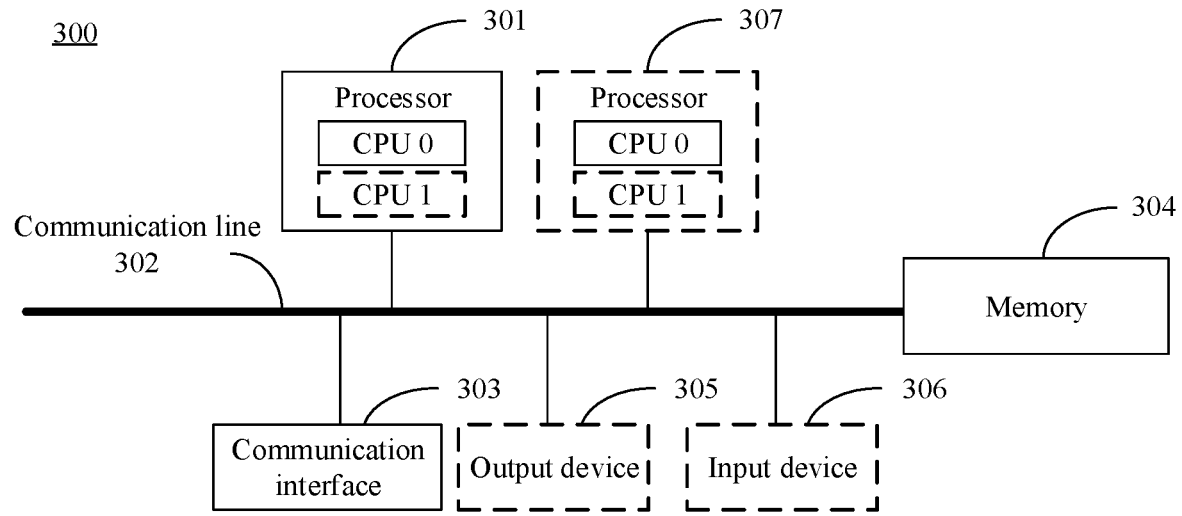
FIG. 3 is a schematic composition diagram of a communication apparatus 300 according to an embodiment of this application.

During specific implementation, each device (for example, the mobility management network element or the session management network element) shown in FIG. 1 may use a composition structure shown in FIG. 3, or include components shown in FIG. 3. FIG. 3 is a schematic composition diagram of a communication apparatus 300 according to an embodiment of this application. The communication apparatus 300 may include a processor 301 and a memory 304. Further, the communication apparatus 300 may include a communication line 302 and a communication interface 303. The processor 301, the memory 304, and the communication interface 303 may be connected to each other through the communication line 302.

The processor 301 may be a central processing unit (CPU), a general-purpose processor, a network processor (NP), a digital signal processor (DSP), a microprocessor, a microcontroller, a programmable logic device (PLD), or any combination thereof. Alternatively, the processor 301 may be another apparatus having a processing function, for example, a circuit, a component, or a software module. This is not limited.

The communication line 302 is configured to transmit information between the components included in the communication apparatus 300.

The communication interface 303 is configured to communicate with another device or another communication network. The other communication network may be an Ethernet, a radio access network (RAN), a wireless local area network (WLAN), or the like. The communication interface 303 may be a module, a circuit, a transceiver, or any apparatus that can implement communication.

The memory 304 is configured to store instructions. The instructions may be a computer program.

The memory 304 may be a read-only memory (ROM) or another type of static storage device that can store static information and/or instructions, a random access memory (RAM) or another type of dynamic storage device that can store information and/or instructions, an electrically erasable programmable read-only memory (EEPROM), a compact disc read-only memory (CD-ROM) or another compact disc storage, an optical disc storage (including a compressed optical disc, a laser disc, an optical disc, a digital versatile disc, or a Blu-ray disc), a magnetic disk storage medium, or another magnetic storage device. This is not limited.

It should be noted that the memory 304 may exist independently of the processor 301, or may be integrated with the processor 301. The memory 304 may be configured to store instructions, program code, some data, or the like. The memory 304 may be located inside the communication apparatus 300, or may be located outside the communication apparatus 300. This is not limited.

The processor 301 is configured to execute the instructions stored in the memory 304, to implement a communication method provided in the following embodiments of this application. For example, when the communication apparatus 300 is a session management network element, or a chip or a system on a chip in a session management network element, the processor 301 executes the instructions stored in the memory 304, to implement steps performed by the session management network element in the following embodiments of this application. For another example, when the communication apparatus 300 is a mobility management network element, or a chip or a system on a chip in a mobility management network element, the processor 301 may execute the instructions stored in the memory 304, to implement steps performed by the mobility management network element in the following embodiments of this application.

In an example, the processor 301 may include one or more CPUs, for example, a CPU 0 and a CPU 1 in FIG. 3.

In an optional implementation, the communication apparatus 300 includes a plurality of processors. For example, in addition to the processor 301 in FIG. 3, the communication apparatus 300 may further include a processor 307.

In an optional implementation, the communication apparatus 300 further includes an output device 305 and an input device 306. For example, the input device 306 is a device such as a keyboard, a mouse, a microphone, or a joystick, and the output device 305 is a device such as a display or a speaker.

It should be noted that the communication apparatus 300 may be a desktop computer, a portable computer, a network server, a mobile phone, a tablet computer, a wireless terminal, an embedded device, a chip system, or a device having a structure similar to that in FIG. 3. In addition, the composition structure shown in FIG. 3 does not constitute a limitation on the communication apparatus. In addition to the components shown in FIG. 3, the communication apparatus may include more or fewer components than those shown in the figure, or some components may be combined, or different component arrangements may be used.

In embodiments of this application, the chip system may include a chip, or may include a chip and another discrete component.

In addition, actions, terms, and the like in embodiments of this application may be mutually referenced. This is not limited. In embodiments of this application, names of messages exchanged between devices, names of parameters in the messages, or the like are merely examples. Another name may alternatively be used during specific implementation. This is not limited.

The following uses the architecture shown in FIG. 1 as an example to describe communication methods provided in embodiments of this application. Network elements in the following embodiments may have the components shown in FIG. 3. Details are not described again. It should be noted, in embodiments of this application, the message names exchanged between devices, the names of the parameters in the messages, or the like are merely examples. Another name may alternatively be used during specific implementation. For example, the term "multicast" in embodiments of this application may be replaced with terms such as broadcast, groupcast, multicast communication, and multicast/broadcast. "Determining" in embodiments of this application may also be understood as creating or generating, and "including" in embodiments of this application may also be understood as "carrying". Descriptions are centrally provided herein. Details are not specifically limited in embodiments of this application.

Figure 4:
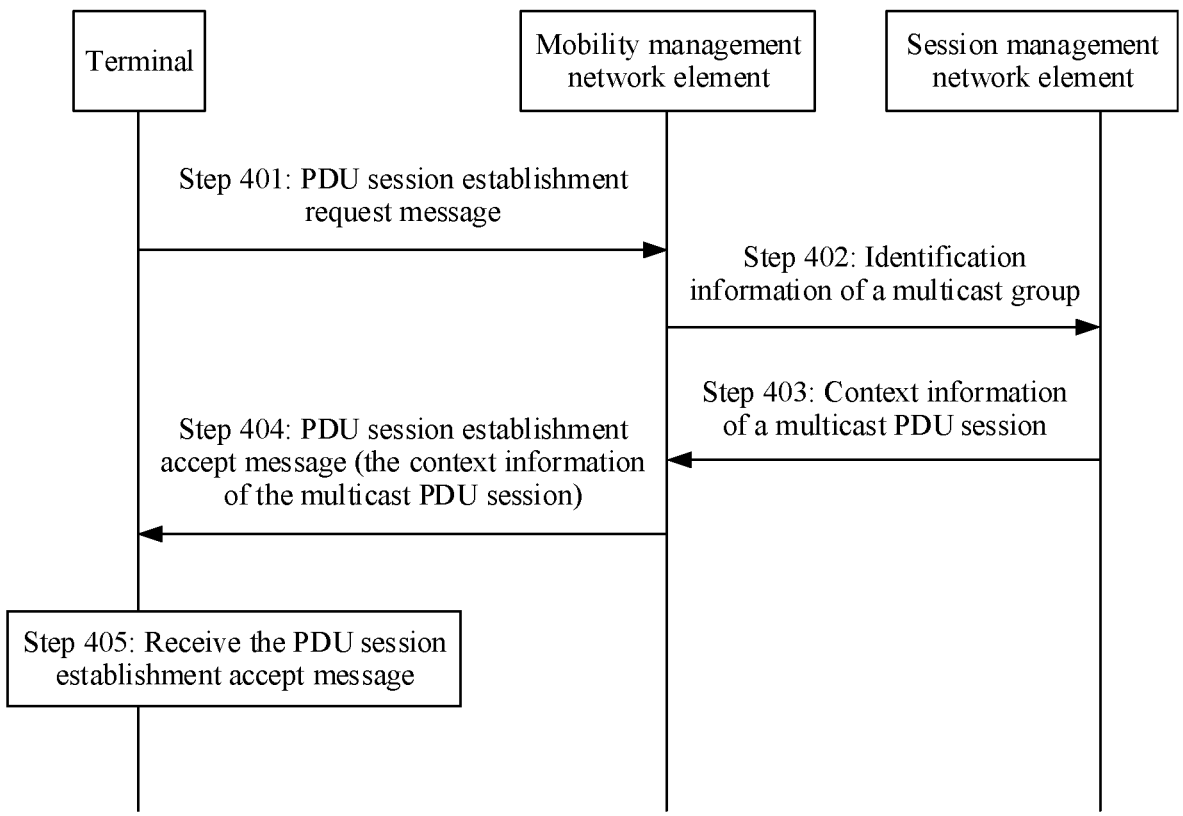
FIG. 4 is a flowchart of a communication method according to an embodiment of this application.

FIG. 4 is a communication method according to an embodiment of this application. As shown in FIG. 4, the method may include the following steps.

Step 401: A terminal sends a PDU session establishment request message to a mobility management network element.

The terminal may be any terminal that supports multicast data transmission in FIG. 1. For example, the terminal may be a terminal 1, a terminal 2, or a terminal 3 in FIG. 1. The mobility management network element may be a mobility management network element that manages the terminal.

The PDU session establishment request message may be used by the terminal to join a multicast group. In this application, that the terminal joins a multicast group may alternatively be described as that the terminal joins a multicast PDU session corresponding to the multicast group. The PDU session establishment request message may include identification information of the multicast group, and may further include other information. The other information may include one or more of identification information of a data network used to transmit multicast data, identification information of a network slice used to transmit multicast data, identification information of a unicast PDU session of the terminal, and identification information of the multicast PDU session. Further, the other information may include identification information of the terminal. To be specific, the terminal may send, to the mobility management network element, a plurality of types of information that includes the identification information of the multicast group, so that the mobility management network element accurately determines, based on the plurality of types of information, a session management network element that manages the multicast PDU session corresponding to the multicast group.

The multicast group may be a combination of a plurality of terminals that receive same data. For example, the multicast group may be a vehicle platoon that receives a command sent by a same command center, or a user group that receives a same television program. Data oriented to the multicast group may be referred to as multicast data, and a receiving object of the multicast data may be two or more terminals. When the multicast data is oriented to a plurality of terminals in one multicast group, all terminals in the multicast group may be authorized to receive the multicast data or may receive the multicast data without authorization.

The identification information of the multicast group may be used to identify the multicast group. The identification information of the multicast group may be a temporary mobile group identity (TMGI) of the multicast group, an internet protocol (IP) address of an application server (for example, an AF providing the multicast data), a service identifier (service ID) of the multicast data, the identification information of the multicast PDU session corresponding to the multicast group, packet filter information of the multicast data, a service data flow (SDF) identification rule of the multicast data, or the like. In addition, the identification information of the multicast group may be preconfigured in a multicast group list. Related descriptions of the multicast group list are as follows.

The identification information of the data network may be a data network name (DNN), and the identification information of the data network may identify/indicate a DN that provides the multicast data.

The identification information of the network slice may identify/indicate a network slice that transmits the multicast data, and the identification information of the network slice may be single network slice selection assistance information (S-NSSAI).

In addition, there may be a correspondence between the identification information of the data network and the identification information of the network slice and the multicast data. The correspondence may be included in a user equipment route selection policy (UE route selection policy, URSP), and the URSP may be preconfigured for the terminal. When determining to join the multicast group, the terminal may locally obtain the URSP, obtain the identification information of the data network and/or the identification information of the network slice from the URSP, and include the identification information of the data network and/or the identification information of the network slice in the PDU session establishment request message.

The identification information of the unicast PDU session of the terminal may identify a PDU session established for the terminal, and the identification information of the unicast PDU session of the terminal may be configured by the terminal. The identification information of the unicast PDU session may be an identifier (ID) of the unicast PDU session.

The identification information of the multicast PDU session may indicate the multicast PDU session corresponding to the multicast group. The identification information of the multicast PDU session may be an ID of the multicast PDU session. The ID of the multicast PDU session may be configured by the terminal. Alternatively, the identification information of the multicast PDU session may be an IP address of an application server that provides the multicast data, the TMGI of the multicast group, or the like. In this case, the terminal may obtain the identification information of the multicast PDU session from the application server, obtain the identification information of the multicast PDU session from a broadcast message (for example, a system information block (SIB)) of an access network device, or obtain the identification information of the multicast PDU session from a non-access stratum (NAS) message sent by a network side device.

The multicast PDU session may be established or not established before step 401 is performed. In some embodiments, the multicast PDU session is a logical channel for transmitting the multicast data, and the multicast PDU session may be established and maintained by a multicast session management network element.

The identification information of the terminal may identify the terminal. The identification information of the terminal may be an internet protocol (IP) address of the terminal, a media access control (MAC) address of the terminal, an international mobile subscriber identity (IMSI) of the terminal, or the like. The identification information of the terminal may be preconfigured for the terminal, for example, configured for the terminal during factory setting of the terminal.

For example, when a user using the terminal has a requirement for receiving the multicast data/joining the multicast group, the terminal is triggered to send the PDU session establishment request message to the mobility management network element. For example, the terminal displays the multicast group list to the user through a man-machine interaction interface. The user selects, from the multicast group list, a multicast group that the user is interested in, and sends a selection result to the terminal. The terminal determines, based on the selection result of the user, to join a multicast group, and is triggered to send the PDU session establishment request message to the mobility management network element. For example, it is assumed that the multicast group list includes television programs such as CCTV1 and CCTV2, and the terminal is a set top box (STB) 1. The STB 1 may display related information of the television programs to the user. The user may manually select a television program that the user wants to watch, for example, select the CCTV1, and send a selection result to the STB 1. The STB 1 sends, to the mobility management network element based on the selection result, a PDU session establishment request message that carries the identification information of the CCTV1.

The multicast group list may include identification information of one or more multicast groups, and the multicast group list may be preconfigured on the terminal or dynamically configured by the application server for the terminal. For example, when the terminal is in an initial state, the multicast group list may be empty. After determining to set up/establish a multicast group, the application server sends, to an application layer of the terminal, a service announcement message that carries the identification information of the multicast group. The application layer of the terminal receives the service announcement message from the application server, obtains the identification information of the multicast group from the service announcement message, and adds the obtained identification information of the multicast group to the multicast group list. Alternatively, the application server configures the identification information of the multicast group for the access network device in an operation and management (OAM) manner, and triggers the access network device to send a broadcast message that includes the identification information of the multicast group. The terminal listens to the broadcast message sent by the access network device, obtains the identification information of the multicast group from the broadcast message, and adds the identification information of the multicast group to the multicast group list. Alternatively, the application server triggers a short message service center (SMSC) to send a short message that carries the identification information of the multicast group to the terminal. The terminal receives the short message, obtains the identification information of the multicast group from the short message, and adds the identification information of the multicast group to the multicast group list.

In an example, that a terminal sends a PDU session establishment request message to a mobility management network element in step 401 may include: The terminal sends the PDU session establishment request message to the access network device through an interface between the terminal and the access network device.

Correspondingly, after receiving the PDU session establishment request message, the access network device forwards the PDU session establishment request message to the mobility management network element.

In another example, step 401 may include: The terminal sends a NAS message to the mobility management network element directly through an interface between the terminal and the mobility management network element, where the NAS message carries the PDU session establishment request message.

To reduce the complexity of parsing the mobility management network element, the PDU session establishment request message may carry an N1 session management container, and the N1 session management container may include the identification information of the multicast group. The N1 session management container may be considered as an information element in the PDU session establishment request message. A type of the information element may implicitly indicate to the mobility management network element not to parse content in the N1 session management container, but to transparently transmit the N1 session management container to a session management network element that manages the multicast PDU session. In this way, after receiving the PDU session establishment request message that carries the N1 session management container, the mobility management network element may not parse the content included in the N1 session management container, to reduce complexity of parsing, by the mobility management network element, the content carried in the PDU session establishment request message. In an embodiment of this application, the N1 session management container may alternatively be named as a transmission container, an N1 session management (SM) container, a transparent container, or the like.

When the N1 session management container includes the identification information of the multicast group, one or more of the identification information of the data network used to transmit the multicast data, the identification information of the network slice used to transmit the multicast data, the identification information of the unicast PDU session of the terminal, and the identification information of the multicast PDU session may be carried in the N1 session management container, or may be carried outside the N1 session management container. This is not limited. For example, the PDU session establishment request message may include an N1 session management container {the identification information of the multicast group, the identification information of the unicast PDU session of the terminal, and the identification information of the multicast PDU session}, the identification information of the data network, and the identification information of the network slice; or the PDU session establishment request message includes an N1 session management container {the identification information of the multicast group, the identification information of the unicast PDU session of the terminal, the identification information of the multicast PDU session, the identification information of the data network, and the identification information of the network slice}.

Step 402: The mobility management network element receives the PDU session establishment request message, and sends the identification information of the multicast group to the session management network element based on the PDU session establishment request message.

The session management network element may manage the multicast PDU session corresponding to the multicast group, and is the multicast session management network element. A process in which the mobility management network element sends the identification information of the multicast group to the session management network element based on the PDU session establishment request message may include the following Example 1 or Example 2.

Example 1: After receiving the PDU session establishment request message, the mobility management network element parses the PDU session establishment request message to obtain the identification information of the multicast group, and the mobility management network element sends recognition information of the multicast data to a first network element. The first network element receives the recognition information of the multicast data, queries a first correspondence by using the recognition information of the multicast data as an index to find identification information of a session management network element corresponding to the recognition information of the multicast data, and sends the identification information of the session management network element to the mobility management network element. The mobility management network element sends the identification information of the multicast group to the session management network element based on the identification information of the session management network element. On the other hand, if the session management network element is not found based on the identification information of the multicast group, the mobility management network element obtains one or more candidate multicast session management network elements, and selects, from the candidate multicast session management network elements, the session management network element that manages the multicast PDU session corresponding to the multicast group, for example, randomly selects a multicast session management network element from the candidate multicast session management network elements as the session management network element that manages the multicast PDU session corresponding to the multicast group, or selects a multicast session management network element with low load or good communication quality as the session management network element that manages a multicast PDU session corresponding to the multicast group. The mobility management network element sends the identification information of the multicast group to the selected session management network element.

The first network element may be an NRF, UDM, a UDR, or a PCF.

The first correspondence may include a correspondence between the recognition information of the multicast data and the identification information of the session management network element. In this way, the correspondence between the recognition information of the multicast data and the identification information of the session management network element may be pre-stored in the first network element, so that the mobility management network element obtains, based on the identification information of the multicast group from the first network element, the identification information of the session management network element that manages the multicast PDU session. This is simple and feasible, simplifies a system design, and reduces power consumption of determining, by the mobility management network element, the session management network element that manages the multicast PDU session.

The identification information of the session management network element may include an IP address of the session management network element, a MAC address of the session management network element, or a fully qualified domain name (FQDN) of the session management network element.

It should be noted that the first correspondence may be preconfigured for the first network element. For example, for some multicast groups, some session management network elements are fixed/preconfigured to manage the multicast groups. A network management system configures the correspondence between the identification information of the session management network element that manages the multicast group and the identification information of the multicast group for the first network element. Alternatively, before a network receives the PDU session establishment request message of the terminal, a core network element previously receives a request from the application server, where the request includes related information about the multicast data corresponding to the multicast group (for example, the recognition information of the multicast data, and QoS requirement information of the multicast data). In this case, the core network element (for example, an NEF or a PCF) selects a corresponding session management network element based on the request of the application server, and stores the first correspondence in the first network element.

The candidate multicast session management network elements may include one or more multicast session management network elements. In a possible design, the mobility management network element may obtain a candidate session management network element from the NRF. For example, the mobility management network element may send a query request to the NRF, where the query request may include the identification information of the multicast group, and the query request may request to query a session management network element that has a function of managing the multicast PDU session corresponding to the multicast group. The NRF receives the query request, determines, based on the identification information of the multicast group, identification information of the session management network element that manages the multicast PDU session corresponding to the multicast group, and sends identification information of the candidate multicast session management network elements to the mobility management network element. For example, the identification information of the multicast group and the identification information of the candidate multicast session management network elements are pre-stored in the NRF. After receiving the query request, the NRF sends, to the mobility management network element, the identification information of the candidate multicast session management network elements corresponding to the identification information of the multicast group. Alternatively, in another possible design, when the mobility management network element parses the PDU session establishment request message to obtain the identification information of the data network used to transmit the multicast data and/or the identification information of the network slice used to transmit the multicast data, the mobility management network element determines, based on the identification information of the data network used to transmit the multicast data, one or more session management network elements that provide a session service for a DN identified by the identification information of the data network, and/or determines, based on the identification information of the network slice used to transmit the multicast data, one or more session management network elements included in a network slice identified by the identification information of the network slice. The mobility management network element determines an intersection between the one or more session management network elements included in the network slice and the one or more session management network elements that provide a network service for the DN as a candidate session management network element.

It should be noted that, in Example 1, if the mobility management network element parses the PDU session establishment request message to obtain the identification information of the multicast PDU session, before performing Example 1, the mobility management network element may further query, by using the identification information of the multicast PDU session as an index, whether a correspondence between the identification information of the multicast PDU session and the identification information of the session management network element is locally stored. If it is found that the correspondence between the identification information of the multicast PDU session and the identification information of the session management network element is locally stored, the identification information of the multicast group is sent to the mobility management network element based on the identification information of the session management network element in the correspondence, and the process described in Example 1 does not need to be performed. On the other hand, if the correspondence between the identification information of the multicast PDU session and the identification information of the session management network element is not locally stored, the process described in Example 1 is performed.

The correspondence between the identification information of the multicast PDU session and the identification information of the session management network element may be stored in the mobility management network element before step 401. For example, before step 401, another terminal or application server triggers the session management network element to establish the multicast PDU session. After establishing the multicast PDU session, the session management network element sends, to the mobility management network element, a multicast PDU session establishment complete message that carries the identification information of the multicast PDU session. After receiving the multicast PDU session establishment complete message, the mobility management network element stores the correspondence between the identification information of the multicast PDU session and the identification information of the session management network element.

Example 2: The session management network element is a default multicast session management network element. Once receiving the PDU session establishment request message, the mobility management network element sends the identification information of the multicast group to the default multicast session management network element. In Example 2, the mobility management network element may not need to parse the PDU session establishment request message, but determine, based on a message type of the PDU session establishment request message, that the PDU session establishment request message is a message used to add the terminal to the multicast group, and forward, to the default multicast session management network element, a message (for example, the identification information of the multicast group and other information) carried in the PDU session establishment request message.

In this application, the mobility management network element may include the identification information of the multicast group in a PDU session context modification request and send the PDU session context modification request to the session management network element. For example, when the PDU session establishment request message carries the N1 session management container, the mobility management network element does not parse the N1 session management container, includes the N1 session management container in the PDU session context modification request, and sends the PDU session context modification request to the session management network element. A name of the PDU session context modification request is not limited in this embodiment of this application. The PDU session context modification request may alternatively be named as an Nsmf_PDU session_create SM context request message or a session management context request (SM context request) message.

In addition to sending the identification information of the multicast group to the session management network element, the mobility management network element may further send one or more of the identification information of the data network used to transmit the multicast data, the identification information of the network slice used to transmit the multicast data, the identification information of the unicast PDU session of the terminal, and the identification information of the multicast PDU session to the session management network element, and may further send the identification information of the terminal to the session management network element.

Step 403: The session management network element receives the identification information of the multicast group, and sends context information of the multicast PDU session to the mobility management network element based on the identification information of the multicast group.

The context information of the multicast PDU session may be used by the terminal to receive the multicast data by using the multicast PDU session. The context information of the multicast PDU session may include one or more of the following information: a start time of the multicast data, an end time of the multicast data, a receiving frequency of the multicast data, and quality of service (QoS) information of the multicast data, so that the terminal configures and receives, based on the information included in the context information of the multicast PDU session, a time-frequency resource, a processing resource, and the like of the multicast data, to improve accuracy of receiving the multicast data by the terminal.

The context information of the multicast PDU session may be stored in a context of the multicast PDU session, and the context of the multicast PDU session may be stored in the first network element or the session management network element after the multicast PDU session is established. Specifically, a network element in which the context of the multicast PDU session is stored may be set as required. This is not limited. In addition to the context information of the multicast PDU session, the context of the multicast PDU session may further include first information. The first information may include the identification information of the multicast group, and may further include one or more of the identification information of the data network used to transmit the multicast data, the identification information of the network slice used to transmit the multicast data, the identification information of the multicast PDU session, and the like. Content included in the first information may be preset as required. This is not limited.

In an example, the session management network element may query whether the context of the multicast PDU session that includes the first information is locally stored. If the context of the multicast PDU session that includes the first information is locally stored, it indicates that the multicast PDU session is established. The context information of the multicast PDU session is obtained from the found context of the multicast PDU session, and is sent to the mobility management network element. Alternatively, the session management network element sends the first information to the first network element that stores the context of the multicast PDU session, to trigger the first network element to query whether the context of the multicast PDU session that includes the first information is locally stored. If the context of the multicast PDU session that includes the first information is locally stored, it indicates that the multicast PDU session is established. The first network element obtains the context information of the multicast PDU session from the found context of the multicast PDU session, and sends the context information of the multicast PDU session to the session management network element. The session management network element receives the context information of the multicast PDU session, and sends the context information of the multicast PDU session to the mobility management network element.

Further, the session management network element updates a context of the multicast group. For example, the context of the multicast group includes a terminal list, and the terminal list includes the identification information of the terminal that joins the multicast group. In this case, the session management network element receives the identification information of the terminal, and adds the identification information of the terminal to the terminal list, and/or the context of the multicast group includes a quantity of terminals. The quantity of terminals may be the quantity of the terminals that has joined the multicast group. In this case, the session management network element increases the quantity of terminals by 1.

The multicast PDU session may be established with reference to the following Manner 1 or Manner 2.

Manner 1: The other terminal sends, to the mobility management network element, the PDU session establishment request message for joining the multicast group, to trigger the session management network element to add the terminal to the multicast PDU session corresponding to the multicast group. The session management network element obtains a multicast policy and charging control (PCC) rule from a policy control network element, and obtains QoS information of the multicast data according to the multicast PCC rule. The session management network element sends the QoS information of the multicast data to the access network device, and requests the access network device to configure a radio transmission resource of the multicast PDU session for the terminal. In addition, the session management network element sends a correspondence between the recognition information of the multicast data and a quality of service flow identifier (QoS flow identifier, QFI) to a user plane network element. The user plane network element receives and stores the correspondence between the recognition information of the multicast data and QFI, to complete establishment of the multicast PDU session. It should be noted that the recognition information of the multicast data in some embodiments of this application may be an identifier of a service data flow (SDF). Specifically, for a process shown in Manner 1, refer to the conventional technology. Details are not described herein.

Manner 2: The application server triggers to establish the multicast PDU session. For example, after determining to establish a multicast group and configuring identification information of the multicast group for the multicast group, the application server sends the identification information of the multicast group and multicast description information corresponding to the multicast group to the PCF. The PCF formulates a multicast PCC rule based on the multicast description information, and sends the multicast PCC rule to the multicast session management network element. The multicast session management network element may generate QoS information of the multicast data according to the multicast PCC rule. The session management network element sends the QoS information of the multicast data to the access network device, and requests the access network device to configure a radio transmission resource of the multicast PDU session for the terminal. In addition, the session management network element sends a correspondence between the recognition information of the multicast data and a QFI to a user plane network element. The user plane network element receives and stores the correspondence between the recognition information of the multicast data and QFI, to complete establishment of the multicast PDU session. Specifically, for a process shown in Manner 2, refer to the conventional technology. Details are not described herein. A message sent by the application server to the PCF may be directly sent by the application server to the PCF, or may be sent to the PCF using an NEF network element or another network element. This is not limited herein.

In an example, if the established multicast PDU session cannot cover the area in which the terminal is located, to be specific, the multicast data cannot be sent, by using the multicast PDU session, to an access network device accessed by the terminal or a tunnel between the access network device and the terminal is not established, the method further includes: The session management network element obtains tunnel information of the access network device via the mobility management network element, and configures the tunnel information of the access network device to a user plane network element corresponding to the multicast PDU session, so that the user plane network element corresponding to the multicast PDU session sends the multicast data to the access network device via the tunnel, sends the QoS information of the multicast data to the access network device, and requests the access network device to configure a radio resource for the terminal. Therefore, the multicast data is sent from the access network device to the terminal by using the radio resource.

The QoS information of the multicast data includes one or more of a QFI of the multicast PDU session, ARP information of the multicast PDU session, rate guarantee information of the multicast PDU session, delay budget information of the multicast PDU session, and error rate information of the multicast PDU session.

In another example, if the context of the multicast PDU session that carries the recognition information of the multicast data is not found based on the first information, it indicates that the multicast PDU session has not been established, and the session management network element is immediately triggered to establish the multicast PDU session in Manner 1. Further, the context of the multicast group may be updated in the foregoing manner. If the context of the multicast PDU session that carries the recognition information of the multicast data is not found based on the first information, the context of the multicast group is updated in the foregoing manner. When determining that the quantity of the terminals that has joined the multicast group is greater than a first threshold, the session management network element is triggered to establish the multicast PDU session in the foregoing manner 1.

The first threshold may be set as required. This is not limited.

For example, that the session management network element sends context information of the multicast PDU session to the mobility management network element may include: The session management network element sends an Nsmf_N1N2 message transfer message to the mobility management network element, where the Nsmf_N1N2 message transfer message carries the context information of the multicast PDU session; or the session management network element sends an Nsmf_PDU session_create SM context response message to the mobility management network element, where the Nsmf_PDU session_create SM context response message carries the context information of the multicast PDU session.

Further, in addition to sending the context information of the multicast PDU session to the mobility management network element, the session management network element may further send, to the mobility management network element, transmission information used by the access network device to configure a radio bearer resource.

Further, the session management network element may further send the correspondence between the identification information of the multicast PDU session and the identification information of the session management network element to the mobility management network element, so that the mobility management network element stores the correspondence between the identification information of the multicast PDU session and the identification information of the session management network element. Subsequently, when another terminal applies to join the multicast group, the mobility management network element may find, based on the correspondence between the identification information of the multicast PDU session and the identification information of the session management network element, the session management network element that manages the multicast PDU session.

Step 404: The mobility management network element receives the context information of the multicast PDU session, and sends a PDU session establishment accept message to the terminal, where the PDU session establishment accept message includes the context information of the multicast PDU session.

The PDU session establishment accept message may be a downlink NAS message, and the PDU session establishment accept message may indicate to the terminal to join the multicast group, in other words, indicate to the terminal to join the multicast PDU session corresponding to the multicast group.

Step 405: The terminal receives the PDU session establishment accept message.

Further, the terminal may receive the multicast data based on the context information of the multicast PDU session by using the multicast PDU session. In this way, one piece of multicast data may be sent to one or more terminals by using the multicast PDU session, to improve resource utilization and transmission efficiency. For example, the application server sends one piece of multicast data to the user plane network element, and the user plane network element sends the multicast data to the access network device by using the multicast PDU session. The access network device broadcasts scheduling information corresponding to the multicast group on a control channel. The terminal receives the multicast data on a receiving frequency of the multicast data based on the scheduling information broadcast by the access network device and the context information of the multicast PDU session.

Based on the method shown in FIG. 4, the terminal sends, to the mobility management network element using an existing PDU session establishment procedure, the PDU session establishment request message that includes the identification information of the multicast group. After receiving the PDU session establishment request message, the mobility management network element sends the identification information of the multicast group in the PDU session establishment request message to the session management network element that manages the multicast PDU session. The session management network element obtains the context information of the multicast PDU session based on the identification information of the multicast group, and sends the context information of the multicast PDU session to the terminal via the mobility management network element, so that the terminal receives the multicast data based on the context information of the multicast PDU session. In this way, an existing PDU session establishment procedure between the terminal and a core network may be reused to add the terminal to the multicast group. This not only implements group communication using the multicast PDU session, but also reduces signaling overheads and simplifies system design.

It should be noted that the PDU session establishment request message in the method shown in FIG. 4 may alternatively be replaced with a PDU session modification request message. Correspondingly, the PDU session establishment accept message may alternatively be replaced with a PDU session modification accept message. In other words, the terminal is added to the multicast group by using a PDU session modification procedure.

Further, in a possible design shown in FIG. 4, to ensure continuity of multicast data transmission, a unicast PDU session may be further established for the terminal. Specifically, a process of establishing the unicast PDU session may include: After receiving the PDU session establishment request message, the mobility management network element selects a session management network element that manages the unicast PDU session, and sends a PDU session context modification request to the session management network element. After receiving the PDU session context modification request, the session management network element determines QFI, selects a user plane network element as an anchor of the unicast PDU session, establishes the unicast PDU session, and sends context information of the unicast PDU session to the terminal via the mobility management network element.

The context information of the unicast PDU session may be used by the terminal to transmit the multicast data by using the unicast PDU session. The context information of the unicast PDU session may include one or more of the following: a start time of the multicast data/an end time of the multicast data when the multicast data is transmitted by using the unicast PDU session, a receiving frequency of the multicast data when the multicast data is transmitted by using the unicast PDU session, and QoS information of the multicast data when the multicast data is transmitted by using the unicast PDU session.

Specifically, for a detailed process of establishing the unicast PDU session, refer to the conventional technology. Details are not described herein.

Further, after the terminal successfully establishes the unicast PDU session, the mobility management network element may store a correspondence between identification information of the unicast PDU session and the identification information of the session management network element. The session management network element may store the correspondence between the identification information of the unicast PDU session and identification information of the user plane network element, for example, store the correspondence between the identification information of the unicast PDU session and the identification information of the user plane network element in a context of the unicast PDU session.

It should be noted that the session management network element that manages the unicast PDU session may be the same as or different from the session management network element that manages the multicast PDU session, and a UPF corresponding to the unicast PDU session may be the same as or different from a UPF corresponding to the multicast PDU session. This is not limited.

Based on the possible design, when the quantity of the terminals that join the multicast group is small and the multicast PDU session is released/unavailable, or when the terminal moves out of a coverage area corresponding to the multicast PDU session, the multicast data may be sent to the terminal by using the unicast PDU session. This ensures that continuity of receiving the multicast data by the terminal is not affected, and avoids data transmission interruption.

Further, in another possible design of the method shown in FIG. 4, as an inverse process in which the terminal joins the multicast group, the terminal may leave the multicast group by using an existing PDU release procedure/the PDU session modification procedure. Specifically, the process may include: The terminal sends a first message to the mobility management network element, where the first message is used by the terminal to leave the multicast group, the first message includes the identification information of the multicast group, and the first message may further include the identification information of the terminal.

The mobility management network element receives the first message, and sends the first message to the session management network element.

The session management network element receives the first message, finds the context of the multicast group based on the first message, and updates the context of the multicast group. For example, the context of the multicast group includes the terminal list, and the terminal list includes the identification information of the terminal that joins the multicast group. In this case, the session management network element receives the identification information of the terminal, and deletes the identification information of the terminal from the terminal list, and/or the context of the multicast group includes the quantity of terminals. The quantity of terminals may be the quantity of the terminals that join the multicast group. In this case, the session management network element decreases the quantity of terminals by 1.

The session management network element sends a response to the first message to the mobility management network element. Correspondingly, the mobility management network element receives the response to the first message, and sends the response to the first message to the terminal.

The first message may be a PDU session release request message, and the response to the first message may be a PDU session release response. Alternatively, the first message may be a PDU session modification request message, and the response to the first message may be a PDU session modification response.

Based on the possible design, the terminal may leave the multicast group by using the PDU session release procedure/PDU session modification procedure, to simplify system design and reduce signaling overheads.

Further, to improve resource utilization, if the quantity of the terminals that join the multicast group is less than a second threshold after the terminal leaves the multicast group, for example, the quantity of the terminals that join the multicast group is zero, the session management network element may send a release notification message to a user plane network element corresponding to the multicast PDU session, to notify the user plane network element corresponding to the multicast PDU session to release the multicast PDU session. In this way, when the quantity of the terminals that join the multicast group is small, especially when no terminal joins the multicast group, the multicast PDU session can be released, to improve resource utilization.

The second threshold may be set as required. This is not limited.

Further, after the multicast PDU session is released, to ensure continuity of multicast data transmission, the session management network element may further send indication information to a user plane network element corresponding to a unicast PDU session of a terminal that needs the multicast data, to indicate to the user plane network element corresponding to the unicast PDU session to transmit the multicast data by using the unicast PDU session. In this way, the user plane network element corresponding to the unicast PDU session may be requested to send the multicast data to the terminal, to ensure that the continuity of receiving the multicast data by the terminal is not affected and to avoid data transmission interruption.

The user plane network element corresponding to the multicast PDU session may be the same as or different from the user plane network element corresponding to the unicast PDU session. If they are different, the session management network element may send indication information to the session management network element that manages the unicast PDU session, and the session management network element that manages the unicast PDU session forwards the indication to the user plane network element corresponding to the unicast PDU session.

With reference to the system shown in FIG. 2a, the following describes the method shown in FIG. 4 by using an example in which a terminal requests to join a multicast group 1, where before the terminal requests to join the multicast group 1, a multicast PDU session corresponding to the multicast group 1 has been established, a session management network element that manages the multicast PDU session corresponding to the multicast group 1 is an SMF 1, a mobility management network element is an AMF, and an access network device is a RAN.

Figure 5:
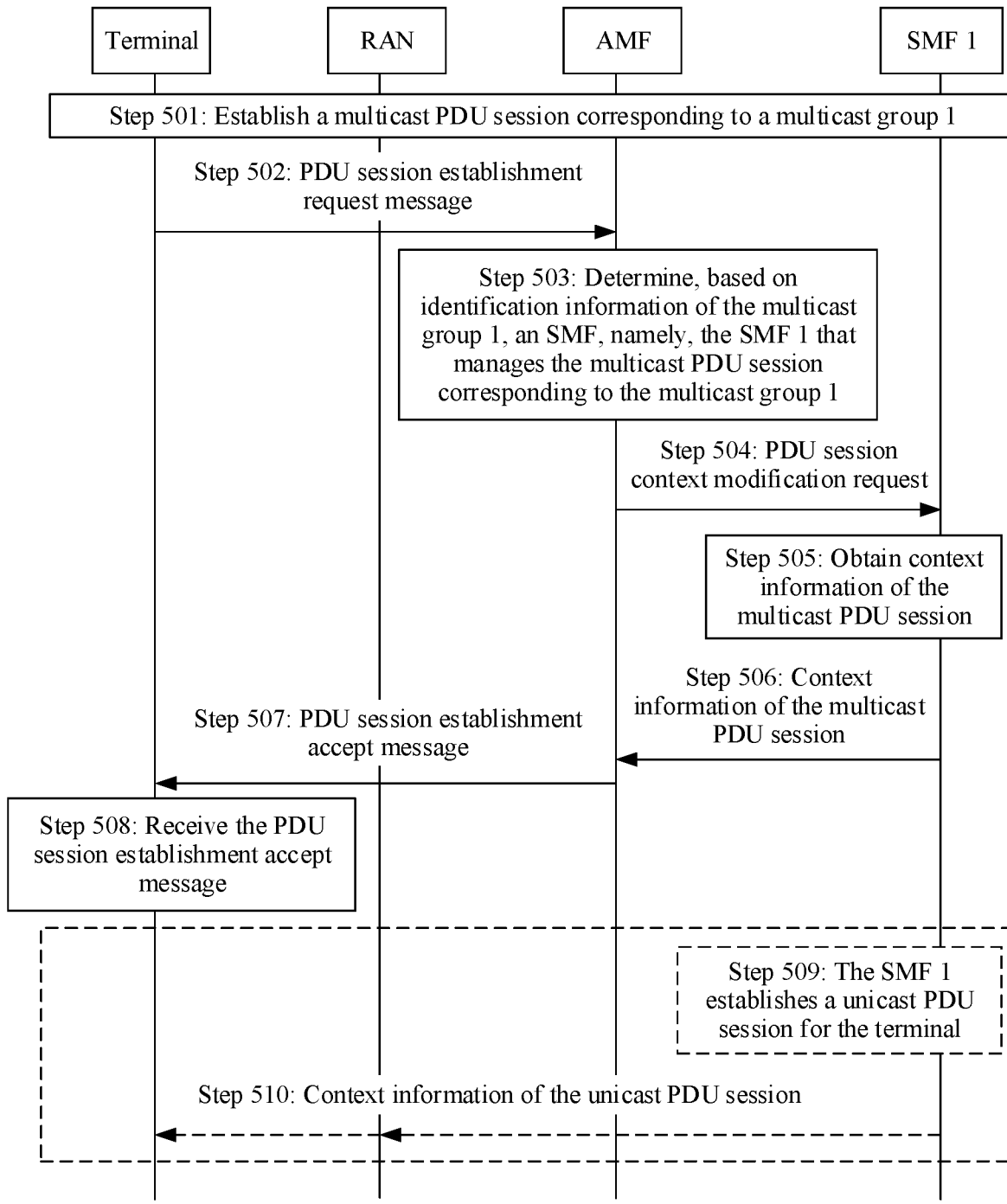
FIG. 5 is a flowchart of another communication method according to an embodiment of this application.

FIG. 5 is another communication method according to an embodiment of this application. As shown in FIG. 5, the method may include the following steps.

Step 501: Establish a multicast PDU session corresponding to a multicast group 1.

For example, the multicast PDU session corresponding to the multicast group 1 may be established according to Manner 1 or Manner 2 in the method shown in FIG. 4. Details are not described again.

Further, after the multicast PDU session is established, an SMF 1 correspondingly stores context information of the multicast PDU session and identification information of the multicast group 1 in a context of the multicast PDU session.

Further, the SMF 1 may further send identification information of the SMF 1 and the identification information of the multicast group 1 to an NRF, and the NRF correspondingly stores the identification information of the SMF 1 and the identification information of the multicast group 1 locally.

In another possible implementation, the SMF 1 may further send identification information of the SMF 1 and the identification information of the multicast group 1 to a UDR or a PCF, and the UDR or the PCF correspondingly stores the identification information of the SMF 1 and the identification information of the multicast group 1 locally.

Step 502: A terminal determines to join the multicast group 1, and sends a PDU session establishment request message to the AMF.

The PDU session establishment request message carries the identification information of the multicast group 1.

In another possible implementation, a terminal sends a PDU session modification request message to an AMF, where the PDU session modification request message carries the identification information of the multicast group 1.

Specifically, for an execution process of step 502, refer to the descriptions in step 401. Details are not described again.

Step 503: The AMF receives the PDU session establishment request message, and determines, based on the identification information of the multicast group 1, an SMF, namely, the SMF 1 that manages the multicast PDU session corresponding to the multicast group 1.

In another possible implementation, the AMF receives the PDU session modification request message, and determines, based on the identification information of the multicast group 1, an SMF, namely, the SMF 1 that manages the multicast PDU session corresponding to the multicast group 1.

The AMF may send the identification information of the multicast group 1 to the NRF. The NRF receives the identification information of the multicast group 1, finds a correspondence between the identification information of the SMF 1 and the identification information of the multicast group 1 by using the identification information of the multicast group 1 as an index, and determines the SMF 1 identified by the identification information of the SMF 1 as the SMF that manages the multicast PDU session.

In another possible implementation, the AMF may send the identification information of the multicast group 1 to the UDR, UDM, or the PCF, and the UDR, the UDM, or the PCF is determined as the SMF that manages the multicast PDU session. A determining manner is similar to a determining manner of the NRF, and details are not described herein.

Step 504: The AMF sends a PDU session context modification request to the SMF 1.

The PDU session context modification request may include the identification information of the multicast group 1.

Step 505: The SMF 1 receives the PDU session context modification request, and obtains the context information of the multicast PDU session based on the identification information of the multicast group 1 that is carried in the PDU session context modification request.

For related descriptions of the context information of the multicast PDU session, refer to the descriptions in FIG. 4. Details are not described herein again.

For example, the SMF 1 may find, by using the identification information of the multicast group 1 as an index, the context of the multicast PDU session that includes the identification information of the multicast group 1, and obtain the context information of the multicast PDU session from the found context of the multicast PDU session.

Further, the SMF 1 increases a quantity of terminals in the context of the multicast group 1 by 1.

Step 506: The SMF 1 sends the context information of the multicast PDU session to the AMF.

The SMF 1 may send a PDU session context modification response to the AMF, where the PDU session context modification response includes the context information of the multicast PDU session.

Step 507: The AMF receives the context information of the multicast PDU session, and sends a PDU session establishment accept message to the terminal, where the PDU session establishment accept message carries the context information of the multicast PDU session.

In another possible implementation, the AMF receives the context information of the multicast PDU session, and sends a PDU session modification accept message to the terminal, where the PDU session modification accept message carries the context information of the multicast PDU session.

Step 508: The terminal receives the PDU session establishment accept message.

In another possible implementation, the terminal receives the PDU session modification accept message.

Further, the terminal may receive multicast data based on the context information of the multicast PDU session.

Optionally, to ensure continuity of multicast data transmission, when the terminal moves out of a multicast area and receiving multicast data using a multicast PDU session is no longer supported, the SMF 1 further triggers to establish a unicast PDU session of the terminal, and switches to transmitting the multicast data by using the unicast PDU session. Specifically, a process in which the SMF 1 establishes the unicast PDU session may include step 509 to step 510.

Step 509: The SMF 1 establishes the unicast PDU session for the terminal.

Specifically, for the process in which the SMF 1 establishes the unicast PDU session, refer to FIG. 3. Details are not described herein again.

Step 510: The SMF 1 sends context information of the unicast PDU session to the terminal via the AMF, and correspondingly, the terminal receives the context information of the unicast PDU session.

Further, the terminal may receive the multicast data based on the context information of the unicast PDU session by using the unicast PDU session. It should be noted that, when the unicast PDU session and the multicast PDU session are established, the context information of the unicast PDU session and the context information of the multicast PDU session may be jointly carried in the PDU session establishment accept message and sent to the terminal, or may be carried in different messages and sent to the terminal. This is not limited.

Based on the method shown in FIG. 5, the terminal sends, to the AMF by using an existing session establishment procedure, the PDU session establishment request message that includes the identification information of the multicast group 1. After receiving the PDU session establishment request message, the AMF sends the identification information of the multicast group 1 in the PDU session establishment request message to the SMF 1. The SMF 1 obtains the context information of the multicast PDU session based on the identification information of the multicast group 1, and sends the context information of the multicast PDU session to the AMF. The AMF includes the context information of the multicast PDU session in the PDU session establishment accept message, and sends the PDU session establishment accept message to the terminal, so that the terminal receives the multicast data based on the context information of the multicast PDU session. In this way, an existing PDU session establishment procedure between the terminal and a core network may be reused to add the terminal to the multicast group 1. This not only implements group communication by using the multicast PDU session, but also reduces signaling overheads, and simplifies a system design.

In the method shown in FIG. 5, an example in which the multicast PDU session is established before the terminal requests to join the multicast group 1 is used for description. In reference to the system shown in FIG. 2a, the following describes the method shown in FIG. 4 by using an example in which a terminal requests to join a multicast group 1, where before the terminal requests to join the multicast group 1, no multicast PDU session is established, a session management network element that manages a multicast PDU session corresponding to the multicast group 1 is an SMF 1, and a mobility management network element is an AMF.

Figure 6:
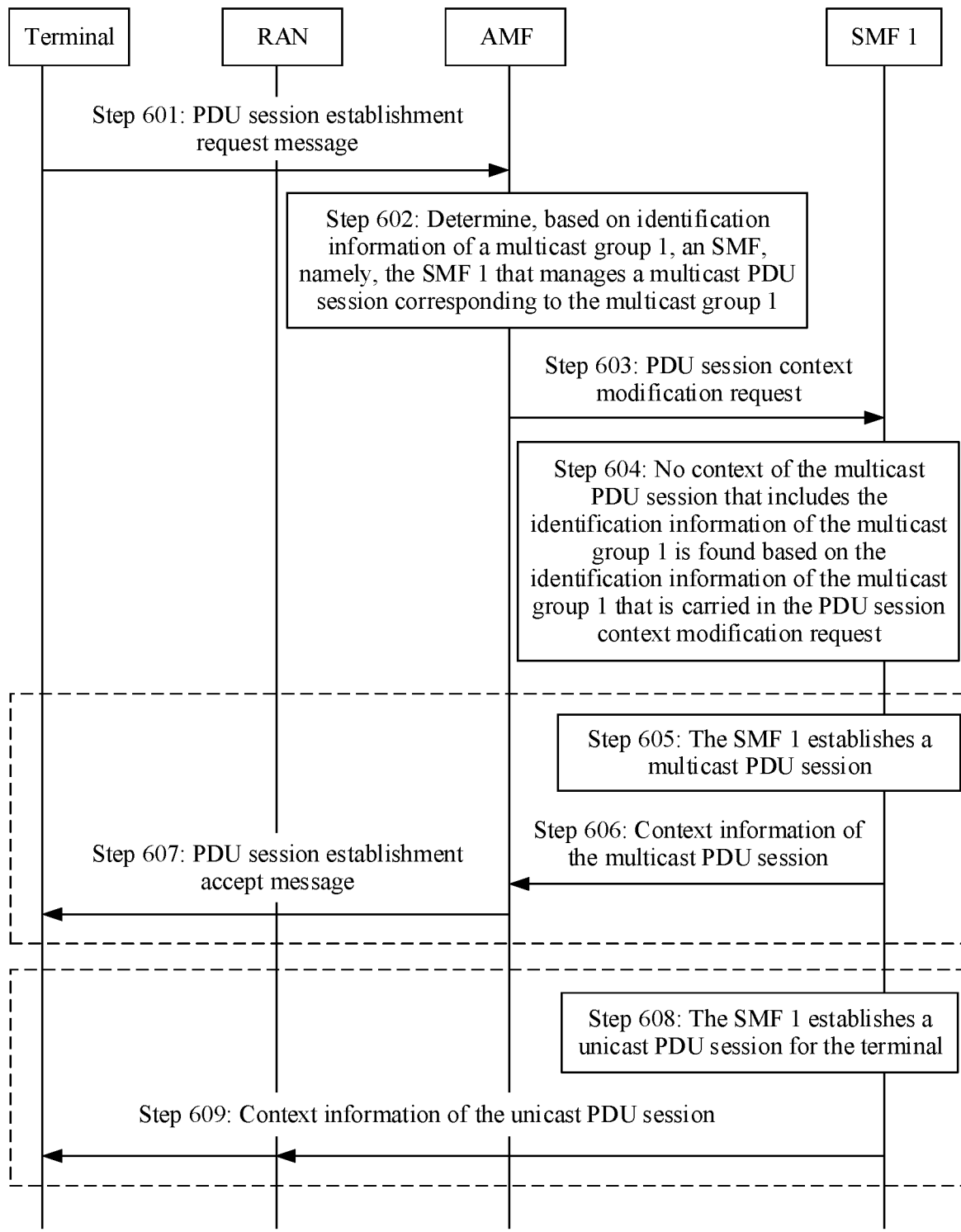
FIG. 6 is a flowchart of still another communication method according to an embodiment of this application.

FIG. 6 is another communication method according to an embodiment of this application. As shown in FIG. 6, the method may include the following steps.

Step 601: A terminal determines to join a multicast group 1, and sends a PDU session establishment request message to an AMF.

The terminal may be a terminal that first joins the multicast group 1, or may not be a terminal that first joins the multicast group 1. This is not limited. The PDU session establishment request message carries identification information of the multicast group 1.

Specifically, for an example execution process of step 602, refer to the descriptions in step 401. Details are not described again.

Step 602: The AMF receives the PDU session establishment request message, and determines, based on the identification information of the multicast group 1, an SMF, namely, an SMF 1 that manages the multicast PDU session corresponding to the multicast group 1.

If the AMF does not obtain, from an NRF based on the identification information of the multicast group 1, the identification information of the SMF that manages the multicast PDU session, the AMF selects the SMF 1 from one or more candidate multicast session management network elements as a candidate multicast session management network element.

For a manner in which the AMF obtains the candidate multicast session management network elements, refer to the descriptions in step 402. Details are not described again.

Step 603: The AMF sends a PDU session context modification request to the SMF 1.

The PDU session context modification request may include the identification information of the multicast group 1.

Step 604: The SMF 1 receives a PDU session modification context request. If a context of the multicast PDU session that includes the identification information of the multicast group 1 is not found based on the identification information of the multicast group 1 that is carried in the PDU session context modification request, the SMF 1 performs step 605 to step 607 to establish a multicast PDU session and the procedure ends; performs step 608 and step 609 to establish a unicast PDU session and the procedure ends; or performs step 605 to step 609 to establish a unicast PDU session and a multicast PDU session.

For related descriptions of context information of the multicast PDU session, refer to the descriptions in FIG. 4. Details are not described herein again.

Step 605: The SMF 1 increases the quantity of terminals in a context of the multicast group 1 by 1. If the quantity of terminals obtained after the increase by 1 is greater than a first threshold, the SMF 1 establishes the multicast PDU session.

Related descriptions of the first threshold and a process in which the SMF 1 establishes the multicast PDU session are shown above. Details are not described.

On the contrary, if the quantity of terminals obtained after the increase by 1 is less than or equal to the first threshold, the SMF 1 establishes the unicast PDU session for the terminal.

Further, after the multicast PDU session is established, the SMF correspondingly stores the context information of the multicast PDU session and the identification information of the multicast group 1 in the context of the multicast PDU session. Further, the SMF 1 may further send identification information of the SMF 1 and the identification information of the multicast group 1 to an NRF, and the NRF correspondingly stores the identification information of the SMF 1 and the identification information of the multicast group 1 locally.

Step 606: The SMF 1 sends the context information of the multicast PDU session to the AMF.

The SMF 1 may send a PDU session context modification response to the AMF, where the PDU session context modification response includes the context information of the multicast PDU session.

Step 607: The AMF receives the context information of the multicast PDU session, and sends a PDU session establishment accept message to the terminal, where the PDU session establishment accept message carries the context information of the multicast PDU session. Correspondingly, the terminal receives the PDU session establishment accept message.

Further, the terminal may receive multicast data based on the context information of the multicast PDU session.

Step 608: The SMF 1 establishes the unicast PDU session for the terminal.

Specifically, for a process in which the SMF 1 establishes the unicast PDU session for the terminal, refer to FIG. 3. Details are not described again.

Step 609: The SMF 1 sends context information of the unicast PDU session to the terminal via the AMF, and correspondingly, the terminal receives the context information of the unicast PDU session.

Further, the terminal may receive multicast data based on the context information of the unicast PDU session.

It should be noted that, when step 605 to step 609 are performed to establish the unicast PDU session and the multicast PDU session, the context information of the unicast PDU session and the context information of the multicast PDU session may be jointly carried in the PDU session establishment accept message and sent to the terminal, or may be carried in different messages and sent to the terminal. This is not limited.

Based on the method shown in FIG. 6, the terminal sends, to the AMF by using an existing session establishment procedure, the PDU session establishment request message that includes the identification information of the multicast group 1. After receiving the PDU session establishment request message, the AMF sends the identification information of the multicast group 1 in the PDU session establishment request message to the SMF 1. The SMF 1 establishes the multicast PDU session, and sends the context information of the multicast PDU session to the AMF. The AMF includes the context information of the multicast PDU session in the PDU session establishment accept message, and sends the PDU session establishment accept message to the terminal, so that the terminal receives the multicast data based on the context information of the multicast PDU session. In this way, an existing PDU session establishment procedure between the terminal and a core network may be reused to add the terminal to the multicast group 1. This not only implements group communication by using the multicast PDU session, but also reduces signaling overheads, and simplifies a system design.

In the methods shown in FIG. 5 and FIG. 6, an example in which the terminal joins the multicast group 1 is used for description. As a reverse process of joining the multicast group by the terminal, the terminal may further leave the multicast group 1 by using an existing procedure, for example, a PDU session release procedure or a PDU session modification procedure. With reference to the system shown in FIG. 2a, the following describes, by using an example in which a terminal leaves a multicast group 1, where a session management network element that manages a multicast PDU session corresponding to the multicast group 1 is an SMF 1, a mobility management network element is an AMF, a user plane network element corresponding to the multicast PDU session is a UPF 1, and a user plane network element corresponding to a unicast PDU session is a UPF 2, a process in which the terminal leaves the multicast group by using the PDU session release procedure in the method shown in FIG. 4.

Figure 7:
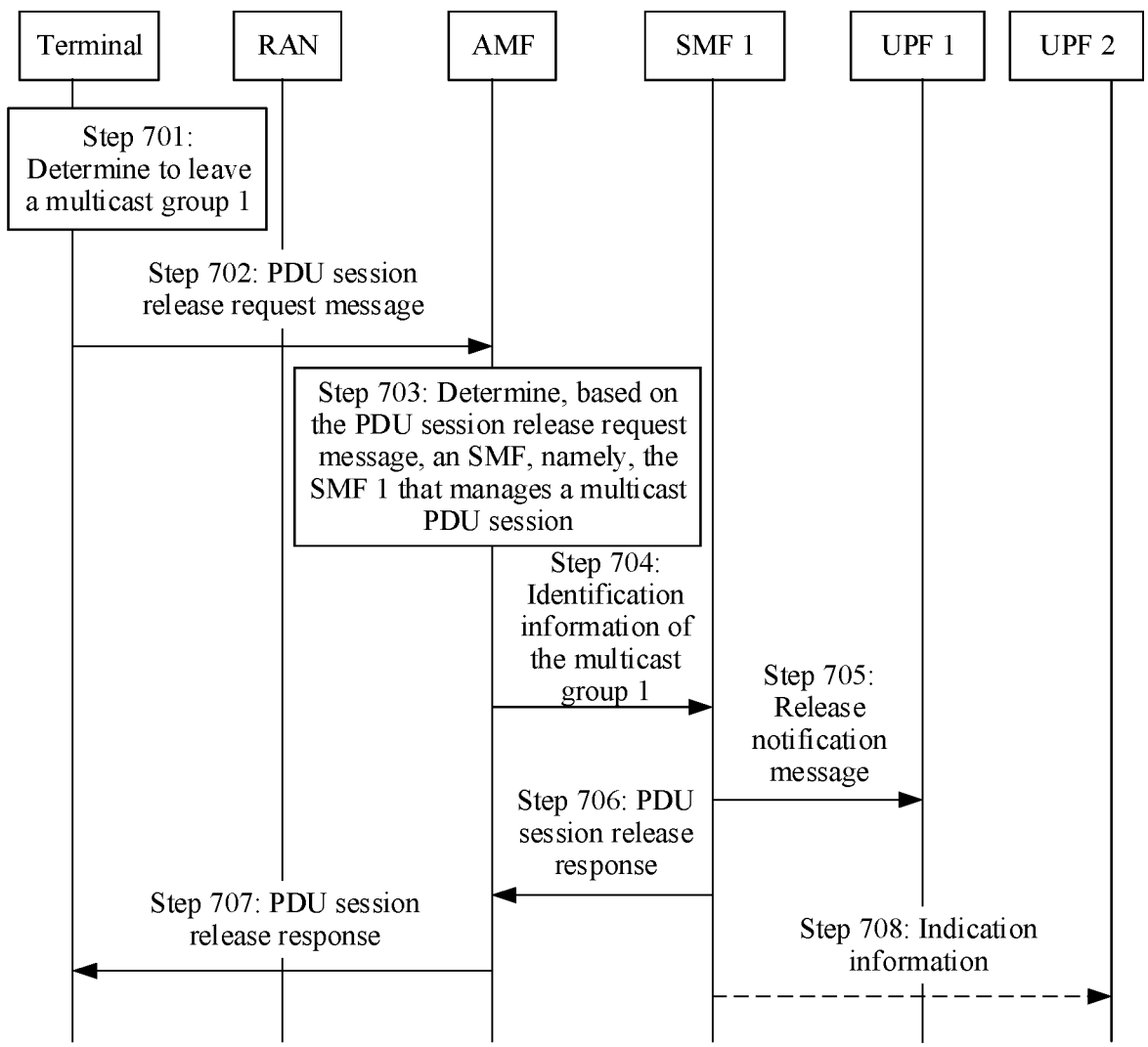
FIG. 7 is a flowchart of yet another communication method according to an embodiment of this application.

FIG. 7 is another communication method according to an embodiment of this application. As shown in FIG. 7, the method may include the following steps.

Step 701: A terminal determines to leave a multicast group 1.

For example, the terminal may determine, based on a user requirement, to leave the multicast group 1. For example, a user may view each multicast group in a multicast group list through a user interaction interface or in some other manner, select, from the multicast group list, a multicast group 1 that the user wants to leave, and send the selection result to the terminal. The terminal receives the selection result of the user, and determines, based on the selection result, to leave the multicast group 1.

For example, it is assumed that the multicast group 1 is a multicast group corresponding to a television program, the multicast group list includes related information of a plurality of television programs, such as CCTV1, CCTV2, . . . , and the like, and the terminal is an STB. When a user watching the CCTV1 leaves the CCTV1, for example, the user switches from the CCTV1 to the CCTV2, the user may manually select the CCTV2 that the user wants to watch, and send a selection result to the STB. The STB may determine, based on the selection result, to leave a multicast group 1 corresponding to the CCTV1.

Step 702: The terminal sends a PDU session release request message to an AMF.

The PDU session release request message may be used by the terminal to leave the multicast group 1.

For example, the PDU session release request message may include identification information of the multicast group 1, and the PDU session release request message may further include one or more of information such as identification information of the terminal, identification information of a data network used to transmit multicast data, identification information of a network slice used to transmit multicast data, and identification information of a multicast PDU session.

To reduce the complexity of parsing the AMF, the PDU session release request message may carry an N1 session management container, where the N1 session management container may include the identification information of the multicast group. The N1 session management container may be considered as an information element in the PDU session release request message. A type of the information element may implicitly indicate to the AMF not to parse content in the N1 session management container, but to transparently transmit the N1 session management container to an SMF that manages a multicast PDU session. In this way, after receiving the PDU session release request message that carries the N1 session management container, the AMF may not parse the content included in the N1 session management container, to reduce complexity of parsing, by the AMF, the content carried in the PDU session release request message.

Step 703: The AMF receives the PDU session release request message, and determines, based on the PDU session release request message, the SMF, namely, an SMF 1 that manages the multicast PDU session.

For a process in which the AMF determines the SMF 1 based on the PDU session release request message, refer to the foregoing process in which the AMF determines the SMF 1 based on the PDU session establishment request message. Details are not described again.

Step 704: The AMF sends the identification information of the multicast group 1 to the SMF 1.

The identification information of the multicast group 1 sent by the AMF to the SMF 1 may be carried in a PDU session update context request or an Nsmf_PDUSession_update SM Context Request.

Step 705: The SMF 1 receives the identification information of the multicast group 1, finds a context of the multicast group 1 based on the identification information of the multicast group 1, and decreases a quantity of terminals in the context of the multicast group 1 by 1. If a quantity of terminals is less than a second threshold after the quantity of terminals is decreased by 1, the SMF 1 sends a release notification message to a UPF 1 corresponding to the multicast PDU session, to notify the UPF 1 to release the multicast PDU session.

For related descriptions of the second threshold, refer to the descriptions in the embodiment corresponding to FIG. 3. Details are not described again.

On the other hand, if the quantity of terminals is greater than or equal to the second threshold after the quantity of terminals is decreased by 1, without affecting another terminal's capability to receive multicast data by using the multicast PDU session, a radio transmission resource between the terminal and a RAN may be released, and the multicast PDU session is retained, to improve resource utilization. For example, the SMF 1 may send a message to the RAN via the AMF, to notify the RAN to release the radio transmission resource between the RAN and the terminal.

Step 706: The SMF 1 sends a PDU session release response to the AMF.

The PDU session release response may carry the identification information of the multicast group 1, and the PDU session release response may indicate that the terminal successfully leaves the multicast PDU session corresponding to the multicast group 1. The PDU session release response may be carried in a PDU session context update response or a Nsmf_PDUSession_update SM Context Response.

Step 707: The AMF receives the PDU session release response, and sends the PDU session release response to the terminal. Correspondingly, the terminal receives the PDU session release response.

So far, the terminal leaves the multicast group 1. Further, the terminal may disable a receiving frequency of a communication group 1 and the like, to reduce power consumption of the terminal and the like.

Further, if a unicast PDU session is established for the terminal, to ensure continuity of multicast data transmission, the method shown in FIG. 7 may further include the following steps.

Step 708: The SMF 1 sends indication information to a UPF 2 corresponding to the unicast PDU session.

For example, in step 708, for one or more terminals that are still in the multicast group 1 and that have established unicast PDU sessions, indication information is sent to UPFs corresponding to the unicast PDU sessions of the terminals.

The indication information indicates the UPF 2 corresponding to the unicast PDU session to send the multicast data by using the unicast PDU session. It should be noted that, if the SMF 1 is not an SMF that manages the unicast PDU session, that the SMF 1 sends indication information to a UPF 2 corresponding to the unicast PDU session may include: The SMF 1 sends the indication information to the SMF that manages the unicast PDU session, and the SMF that manages the unicast PDU session sends the indication information to the UPF 2 corresponding to the unicast PDU session.

Based on the method shown in FIG. 7, the terminal sends, to the AMF by using an existing session release procedure, the PDU session release request message that includes the identification information of the multicast group 1. After receiving the PDU session release request message, the AMF sends the identification information of the multicast group 1 in the PDU session release request message to the SMF 1. The SMF 1 decreases the quantity of terminals in the multicast group 1 by 1 based on the multicast group 1. The terminal leaves the multicast group 1, and no longer sends the multicast data to the terminal by using the multicast PDU session. In this way, an existing PDU session release procedure can be reused to enable the terminal to leave the multicast group 1, to reduce signaling overheads and simplify system design.

The foregoing mainly describes the solutions provided in embodiments of this application from a perspective of interaction between nodes. It may be understood that, to implement the foregoing functions, the nodes such as the terminal, the mobility management network element, and the session management network element include corresponding hardware structures and/or software modules for performing the functions. A person of ordinary skill in the art should easily be aware that, in combination with algorithms and steps in the examples described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for a particular application, but it should not be considered that such implementation is beyond the scope of this application.

In embodiments of this application, the terminal, the mobility management network element, the session management network element, and the like may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in embodiments of this application, module division is shown as an example, and in some embodiments, the module division is a logical function division. In actual implementation, another division manner may be used.

Figure 8:
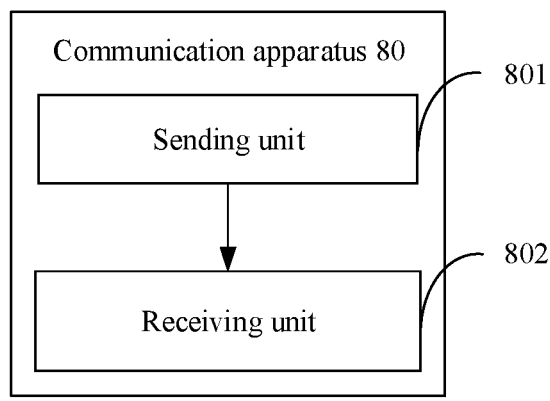
FIG. 8 is a schematic composition diagram of a communication apparatus 80 according to an embodiment of this application.

FIG. 8 is a schematic composition diagram of a communication apparatus 80 according to an embodiment of this application. The communication apparatus 80 may be a terminal, or a chip or a system on a chip in a terminal. In a possible design, as shown in FIG. 8, the communication apparatus 80 may include a sending unit 801 and a receiving unit 802.

The sending unit 801 is configured to send, to a mobility management network element, a PDU session establishment request message that includes identification information of a multicast group. For example, the sending unit 801 supports the communication apparatus 80 in performing step 401, step 502, and step 601.

The receiving unit 802 is configured to receive a PDU session establishment accept message that is sent by the mobility management network element and that includes context information of a multicast PDU session. For example, the receiving unit 802 may be configured to support the communication apparatus 80 in performing step 410, step 508, step 607, and the like.

Specifically, in the possible design, related content of the steps related to the terminal in the method embodiments shown in FIG. 4 to FIG. 7 may be referenced in function descriptions of corresponding functional modules. Details are not described herein again. The communication apparatus 80 in the possible design is configured to perform the functions of the terminal in the communication methods shown in FIG. 4 to FIG. 7. Therefore, an effect the same as that of the foregoing communication methods can be achieved.

It should be noted that, in another possible implementation, the communication apparatus 80 shown in FIG. 8 may include a processing module and a communication module. Functions of the sending unit 801 and the receiving unit 802 may be integrated into the communication module. The processing module is configured to control and manage an action of the communication apparatus 80. For example, the processing module is configured to support the communication apparatus 80 in performing another process of the technology described in this specification. The communication module is configured to support the communication apparatus 80 in performing step 401, step 502, step 601, step 410, step 508, step 607, and the like, and communicating with another network entity. Further, the communication apparatus 80 shown in FIG. 8 may further include a storage module, configured to store program code and data of the communication apparatus 80.

The processing module may be a processor or a controller. The processor may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communication module may be a transceiver circuit, a communication interface, or the like. The storage module may be a memory. When the processing module is a processor, the communication module is a communication interface, and the storage module is a memory, the communication apparatus 80 shown in FIG. 8 may be the communication apparatus shown in FIG. 3.

Figure 9:
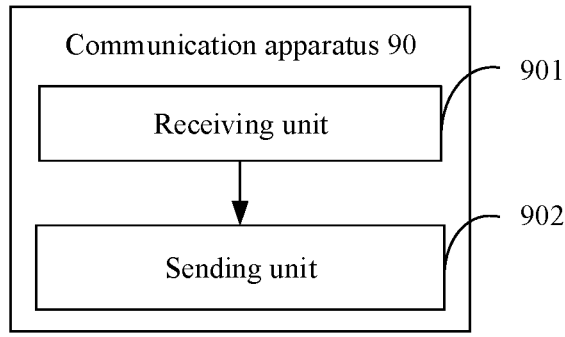
FIG. 9 is a schematic composition diagram of a communication apparatus 90 according to an embodiment of this application.

FIG. 9 is a schematic composition diagram of a communication apparatus 90 according to an embodiment of this application. The communication apparatus 90 may be a mobility management network element, or a chip or a system on a chip in a mobility management network element. As shown in FIG. 9, the communication apparatus 90 may include a receiving unit 901 and a sending unit 902.

The receiving unit 901 is configured to receive, from a terminal, a PDU session establishment request message that includes identification information of a multicast group. For example, the receiving unit 901 may be configured to support the communication apparatus 90 in performing step 402, step 503, step 602, and the like.

The sending unit 902 is configured to send the identification information of the multicast group to a session management network element based on the PDU session establishment request message. For example, the sending unit 902 is configured to support the communication apparatus 90 in performing step 402, step 504, step 603, and the like.

The receiving unit 901 is further configured to receive context information of a multicast PDU session from the session management network element. For example, the receiving unit 901 may be further configured to support the communication apparatus 90 in performing step 409, step 507, step 607, and the like.

The sending unit 902 is further configured to send, to the terminal, a PDU session establishment accept message that includes the context information of the multicast PDU session. For example, the sending unit 902 is configured to support the communication apparatus 90 in performing step 409, step 507, and step 607.

Specifically, in the possible design, related content of the steps related to the mobility management network element in the method embodiments shown in FIG. 4 to FIG. 7 may be referenced in function descriptions of corresponding functional modules. Details are not described herein again. The communication apparatus 90 in the possible design is configured to perform the functions of the mobility management network element in the communication methods shown in FIG. 4 to FIG. 7. Therefore, an effect the same as that of the foregoing communication methods can be achieved.

It should be noted that, in another possible implementation, the communication apparatus 90 shown in FIG. 9 may include a processing module and a communication module. Functions of the sending unit 902 and the receiving unit 901 may be integrated into the communication module. The processing module is configured to control and manage an action of the communication apparatus 90. For example, the processing module is configured to support the communication apparatus 90 to perform another process of the technology described in this specification. The communication module is configured to support the communication apparatus 90 in performing step 402, step 503, step 703, and the like, and communicating with another network entity. Further, the communication apparatus 90 shown in FIG. 9 may further include a storage module, configured to store program code and data of the communication apparatus 90.

The processing module may be a processor or a controller. The processor may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communication module may be a transceiver circuit, a communication interface, or the like. The storage module may be a memory. When the processing module is a processor, the communication module is a communication interface, and the storage module is a memory, the communication apparatus 90 shown in FIG. 9 may be the communication apparatus shown in FIG. 3.

Figure 10:
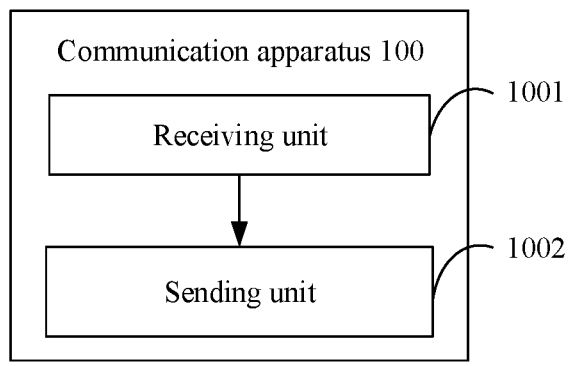
FIG. 10 is a schematic composition diagram of a communication apparatus 100 according to an embodiment of this application.

FIG. 10 is a schematic composition diagram of a communication apparatus 100 according to an embodiment of this application. The communication apparatus 100 may be a session management network element, or a chip or a system on a chip in a session management network element. As shown in FIG. 10, the communication apparatus 100 may include a receiving unit 1001 and a sending unit 1002.

The receiving unit 1001 is configured to receive identification information of a multicast group from a mobility management network element. For example, the receiving unit 1001 may be configured to support the communication apparatus 100 to perform step 403, step 505, and step 604.

The sending unit 1002 is configured to send context information of a multicast PDU session to the mobility management network element based on the identification information of the multicast group. For example, the sending unit 1002 may be configured to support the communication apparatus 100 in performing step 403, step 506, and step 606.

Specifically, in the possible design, related content of the steps related to the session management network element that manages the multicast PDU session in the method embodiments shown in FIG. 4 to FIG. 7 may be referenced to function descriptions of corresponding functional modules. Details are not described herein again. The communication apparatus 100 in the possible design is configured to perform the functions of the session management network element that manages the multicast PDU session in the communication methods shown in FIG. 4 to FIG. 7. Therefore, an effect the same as that of the foregoing communication methods can be achieved.

It should be noted that, in another possible implementation, the communication apparatus 100 shown in FIG. 10 may include a processing module and a communication module. Functions of the receiving unit 1001 and the sending unit 1002 may be integrated into the communication module. The processing module is configured to support the communication apparatus 100 in controlling and managing an action of the communication apparatus 100. The communication module is configured to support the communication apparatus 100 in performing step 403, step 505, step 604, step 506, step 606, and the like, and communicating with another network entity. Further, the communication apparatus 100 shown in FIG. 10 may further include a storage module, configured to store program code and data of the communication apparatus 100.

The processing module may be a processor or a controller. The processor may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communication module may be a transceiver circuit, a communication interface, or the like. The storage module may be a memory. When the processing module is a processor, the communication module is a communication interface, and the storage module is a memory, the communication apparatus 100 shown in FIG. 10 may be the communication apparatus shown in FIG. 3.

Figure 11:
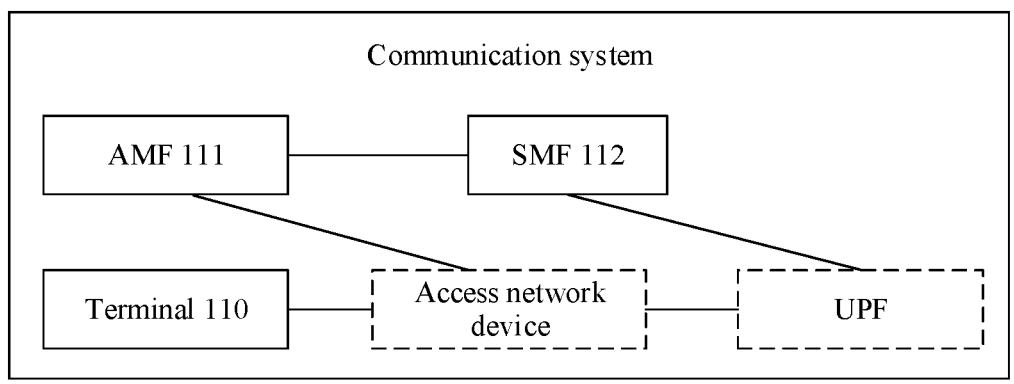
FIG. 11 is a schematic composition diagram of a communication system according to an embodiment of this application.

FIG. 11 is a schematic composition diagram of a communication system according to an embodiment of this application. As shown in FIG. 11, the communication system may include a terminal 110, an AMF 111, and an SMF 112. Further, the system shown in FIG. 11 may include an access network device and another network element, for example, a UPF. A function of the terminal 110 is the same as that of the communication apparatus 80. A function of the AMF 111 is the same as that of the communication apparatus 90. A function of the SMF 112 is the same as that of the communication apparatus 100.

For example, the terminal 110 is configured to send, to the AMF 111, a PDU session establishment request message that includes identification information of a multicast group. The AMF 111 is configured to send the received identification information of the multicast group to the SMF 112. The SMF 112 is configured to send context information of a multicast PDU session to the AMF 111 based on the identification information of the multicast group. The AMF 111 is further configured to: receive the context information of the multicast PDU session, and send the received context information of the multicast PDU session to the terminal 110.

Specifically, for an execution process of each network element in FIG. 11, refer to the execution steps of the network element in the foregoing method. Details are not described herein. Based on the system shown in FIG. 11, the terminal 110 sends, to the AMF 111 by using an existing session establishment procedure, the PDU session establishment request message that includes the identification information of the multicast group. After receiving the PDU session establishment request message, the AMF 111 sends the identification information of the multicast group in the PDU session establishment request message to the SMF 112 that manages the multicast PDU session, so that the SMF 112 sends the context information of the multicast PDU session to the AMF 111 based on the identification information of the multicast group. The AMF 111 sends the context information of the multicast PDU session to the terminal 110, so that the terminal 110 receives multicast data based on the context information of the multicast PDU session. In this way, an existing PDU session establishment procedure between the terminal 110 and a core network may be reused to add the terminal 110 to the multicast group, to implement group communication and simplify a system design.

Based on the descriptions of the foregoing implementations, a person skilled in the art can clearly understand that, for ease and brevity of description, division into the foregoing functional modules is merely used as an example for illustration. In actual application, the foregoing functions can be allocated to different functional modules and implemented as required. In other words, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the module or division into the units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application essentially, or the part contributing to the conventional technology, or all or some of the technical solutions may be implemented in the form of a software product. The software product is stored in a storage medium and includes several instructions for instructing a device (which may be a single-chip microcomputer, a chip or the like) or a processor to perform all or some of the steps of the methods described in embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A communication method, comprising:
sending, by a terminal or a chip configured for the terminal, a packet data unit (PDU) session establishment request message to a mobility management network element, wherein the PDU session establishment request message comprises identification information of a multicast group, and the PDU session establishment request message is used by the terminal to join the multicast group;
receiving, by the terminal or the chip, a PDU session establishment accept message from the mobility management network element, wherein the PDU session establishment accept message comprises context information of a multicast PDU session corresponding to the multicast group; and joining the multicast group and receiving multicast data using the multicast PDU session based on the context information of the multicast PDU session.

2. The method according to claim 1, wherein the PDU session establishment request message comprises one or more selected from the following: identification information of a data network used to transmit the multicast data, identification information of a network slice used to transmit the multicast data, identification information of a unicast PDU session of the terminal, or identification information of the multicast PDU session.

3. The method according to claim 1, wherein the context information of the multicast PDU session comprises one or more selected from the following: a start time of the multicast data, an end time of the multicast data, a receiving frequency of the multicast data, or quality of service (QOS) information of the multicast data.

4. The method according to claim 1, wherein the method further comprises:
receiving, by the terminal or the chip, context information of a unicast PDU session from the mobility management network element; and
receiving the multicast data using the unicast PDU session based on the context information of the unicast PDU session.

5. The method according to claim 1, wherein the method further comprises:
sending, by the terminal or the chip, a first message to the mobility management network element, wherein the first message is used by the terminal to leave the multicast group, and the first message comprises the identification information of the multicast group;
receiving, by the terminal or the chip, a response to the first message from the mobility management network element; and
disjoining the multicast group by the terminal or the chip.

6. A communication method, comprising:
receiving, by a mobility management network element, a packet data unit (PDU) session establishment request message from a terminal, wherein the PDU session establishment request message comprises identification information of a multicast group, and the PDU session establishment request message is used by the terminal to join the multicast group;
sending, by the mobility management network element, the identification information of the multicast group to a session management network element based on the PDU session establishment request message, wherein the session management network element is configured to manage a multicast PDU session corresponding to the multicast group;
receiving, by the mobility management network element, context information of the multicast PDU session from the session management network element, wherein the context information of the multicast PDU session is used by the terminal to receive the multicast data during the multicast PDU session; and
sending, by the mobility management network element, a PDU session establishment accept message to the terminal, wherein the PDU session establishment accept message comprises the context information of the multicast PDU session.

7. The method according to claim 6, wherein the PDU session establishment request message comprises one or more selected from the following: identification information of a data network used to transmit the multicast data, identification information of a network slice used to transmit the multicast data, identification information of a unicast PDU session of the terminal, or identification information of the multicast PDU session.

8. The method according to claim 6, wherein the context information of the multicast PDU session comprises one or more selected from the following: a start time of the multicast data, an end time of the multicast data, a receiving frequency of the multicast data, or quality of service (QOS) information of the multicast data.

9. The method according to claim 6, wherein the method further comprises:
receiving, by the mobility management network element, a first message from the terminal, wherein the first message is used by the terminal to leave the multicast group, and the first message comprises identification information of the multicast group;
sending, by the mobility management network element, the first message to the session management network element; and
receiving, by the mobility management network element, a response to the first message from the session management network element, and sending the response to the first message to the terminal.

10. The method according to claim 6, wherein the sending, by the mobility management network element, the identification information of the multicast group to a session management network element based on the PDU session establishment request message comprises:
sending, by the mobility management network element, the identification information of the multicast group to a first network element; and
receiving, by the mobility management network element, identification information of the session management network element from the first network element, and sending the identification information of the multicast group to the session management network element based on the identification information of the session management network element.

11. A communication method, comprising:
receiving, by a session management network element, identification information of a multicast group from a mobility management network element;
sending, by the session management network element to the mobility management network element based on the identification information of the multicast group, context information of a multicast packet data unit (PDU) session corresponding to the multicast group, wherein the context information of the multicast PDU session is used by a terminal to receive multicast data by using the multicast PDU session, and the session management network element obtains the context information of the multicast PDU session when a quantity of terminals that join the multicast group exceeds a first threshold.

12. The method according to claim 11, wherein the method further comprises:
sending, by the session management network element, the identification information of the multicast group to a first network element; and
receiving, by the session management network element, the context information of the multicast PDU session from the first network element.

13. The method according to claim 11, wherein the method further comprises:

receiving, by the session management network element, one or more selected from the following information from the mobility management network element: identification information of a data network used to transmit the multicast data, identification information of a network slice used to transmit the multicast data, identification information of a unicast PDU session of the terminal, or identification information of the multicast PDU session.

14. The method according to claim 11, wherein the context information of the multicast PDU session comprises one or more selected from the following: a start time of the multicast data, an end time of the multicast data, a receiving frequency of the multicast data, or quality of service QoS information of the multicast data.

15. The method according to claim 11, wherein the method further comprises:
sending, by the session management network element, context information of a unicast PDU session, wherein the context information of the unicast PDU session is used by the terminal to receive the multicast data by using the unicast PDU session.

16. The method according to claim 11, wherein the method further comprises:
receiving, by the session management network element, a first message, wherein the first message is used by the terminal to leave the multicast group, and the first message comprises the identification information of the multicast group;
updating, by the session management network element, a context of the multicast group based on the first message; and
sending, by the session management network element, a response to the first message.

17. A communication system, comprising:
a mobility management network device comprising a first processor, configured to: receive a packet data unit (PDU) session establishment request message from a terminal, and send identification information of a multicast group to a session management network device based on the PDU session establishment request message, wherein the session management network device is configured to manage a multicast PDU session corresponding to the multicast group, the PDU session establishment request message comprises the identification information of the multicast group, and the PDU session establishment request message is used by the terminal to join the multicast group; and
the session management network device comprising a second processor, configured to: receive the identification information of the multicast group from the mobility management network device, and send context information of a multicast PDU session corresponding to the multicast group to the mobility management network device based on the identification information of the multicast group, wherein the context information of the multicast PDU session is used by the terminal to receive multicast data by using the multicast PDU session, wherein
the mobility management network device is further configured to: receive the context information of the multicast PDU session, and send a PDU session establishment accept message to the terminal, wherein the PDU session establishment accept message comprises the context information of the multicast PDU session.

18. The method according to claim 5, wherein the first message is a PDU session release request message or a PDU session modification request message.

19. The method according to claim 9, wherein the first message is a PDU session release request message or a PDU session modification request message.

20. The method according to claim 16, wherein the first message is a PDU session release request message or a PDU session modification request message.

* * * * *